Figure 3:
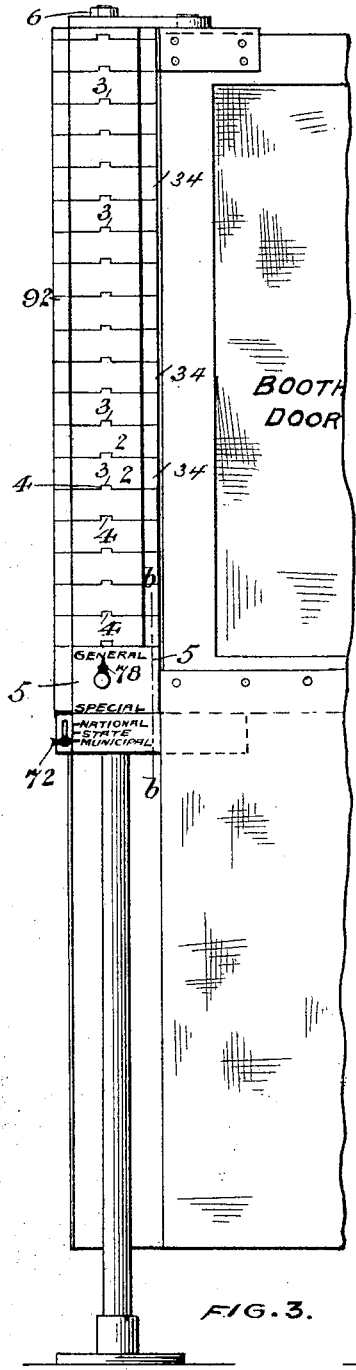

No. 636,730. Patented Nov. 7, 1899.
J. H. DEAN.
VOTING MACHINE.
(Application filed Dec. 19, 1898.)
(No Model.) 8 Sheets—Sheet 1.
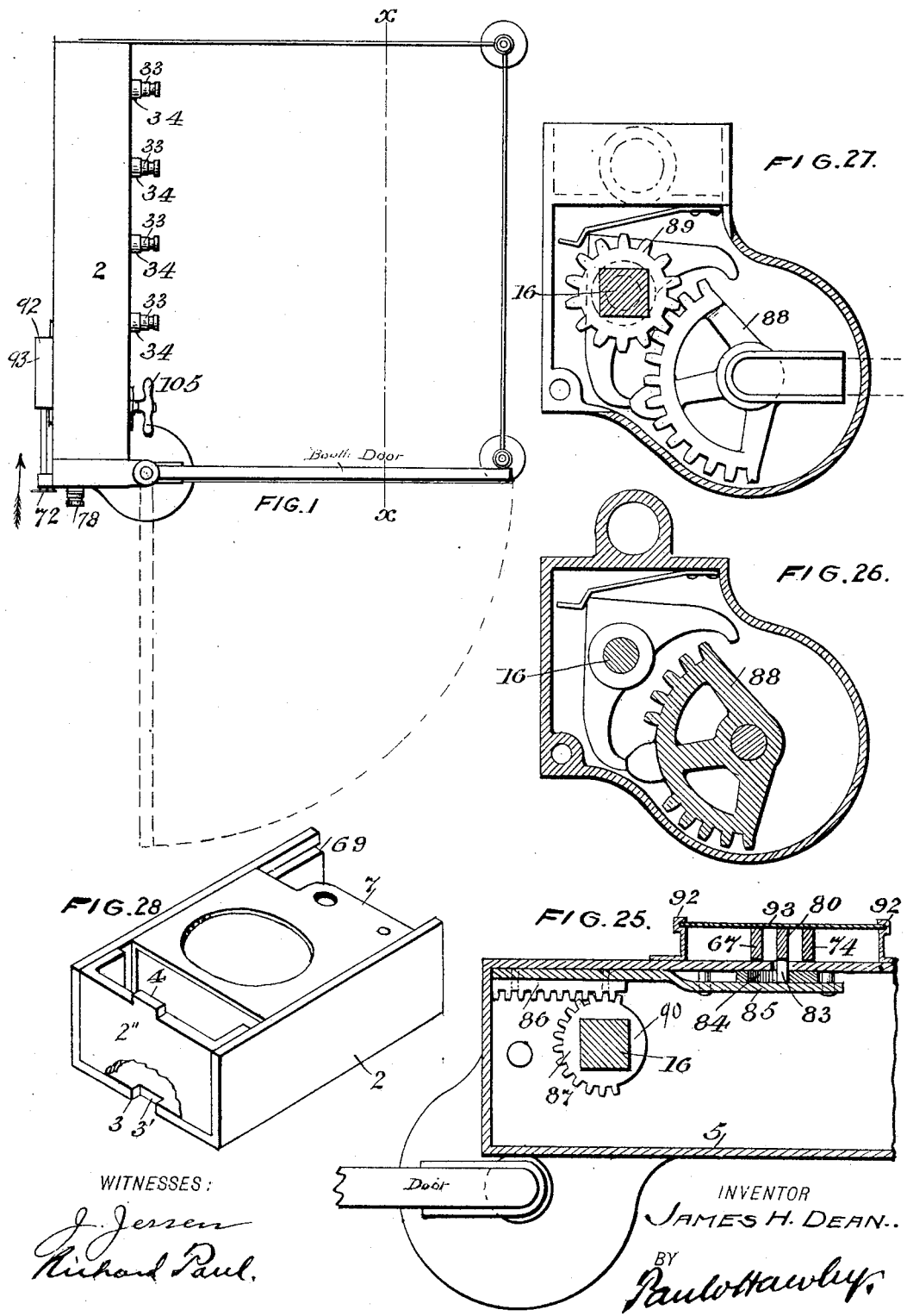
WITNESSES:
INVENTOR
JAMES H. DEAN..
BY
HIS ATTORNEYS No. 636,730. Patented Nov. 7, 1899.
J. H. DEAN.
VOTING MACHINE.
(Application filed Dec. 19, 1898.)

(No Model.) 8 Sheets—Sheet 2.

WITNESSES:
J. Jessen
Richard Paul

INVENTOR
JAMES H. DEAN.
BY
Paul O. Hawley
HIS ATTORNEYS

No. 636,730. Patented Nov. 7, 1899.
J. H. DEAN.
VOTING MACHINE.
(Application filed Dec. 19, 1898.)
(No Model.) 8 Sheets—Sheet 3.
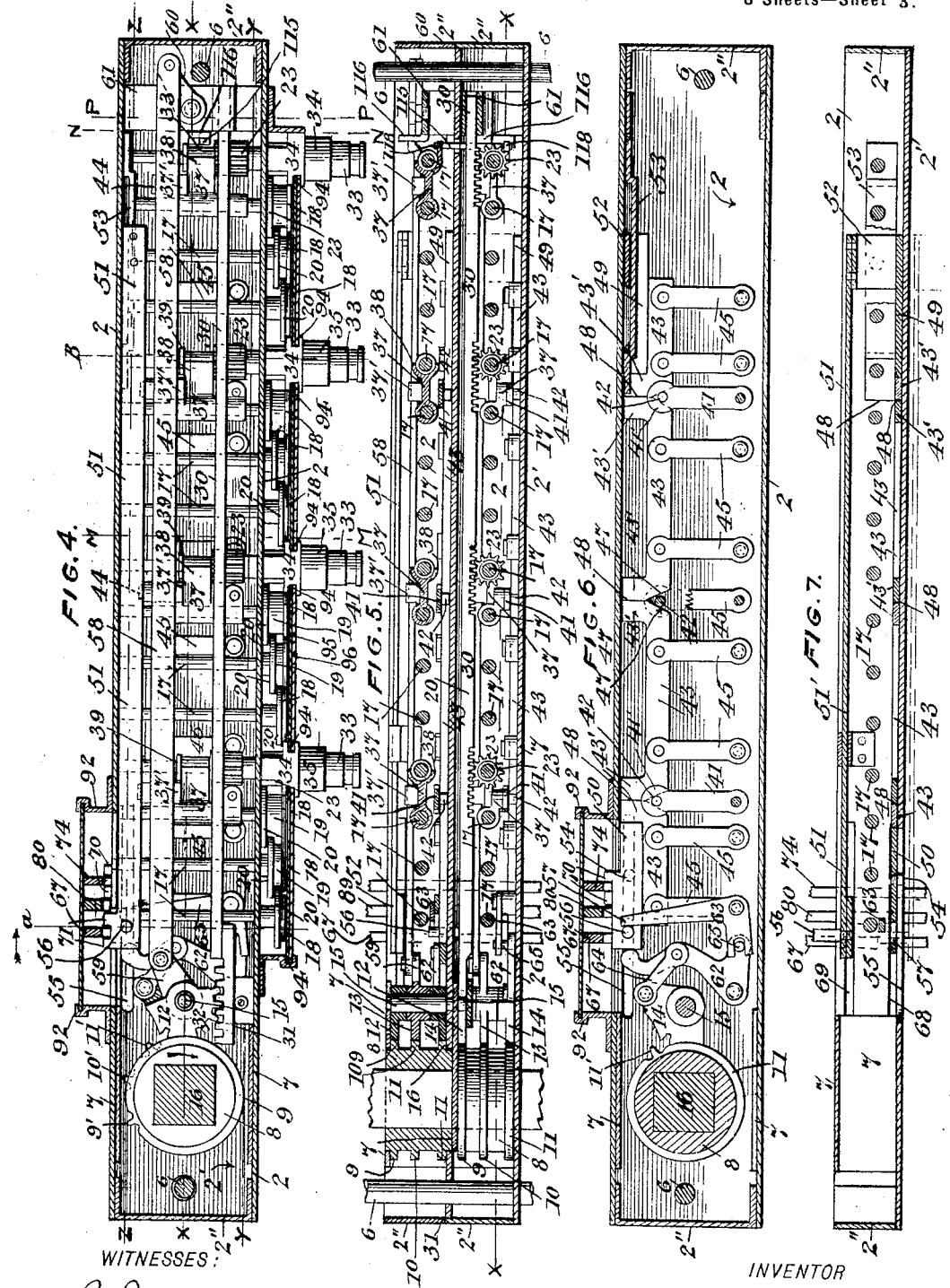
WITNESSES:
J. Jessen
Richard Paul
INVENTOR
JAMES H. DEAN.
BY
Paul O Hawley
HIS ATTORNEYS No. 636,730. Patented Nov. 7, 1899.
J. H. DEAN.
VOTING MACHINE.
(Application filed Dec. 19, 1898.)
(No Model.) 8 Sheets—Sheet 4.
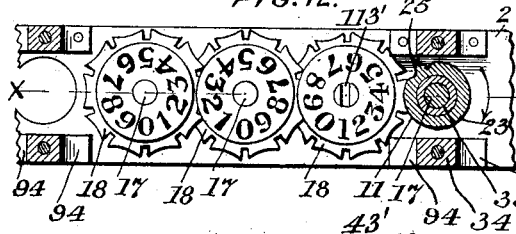
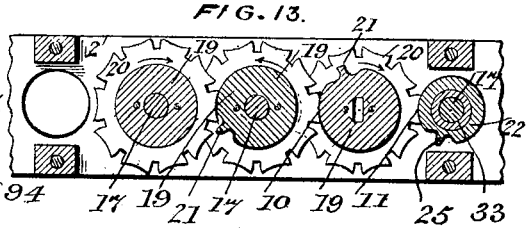
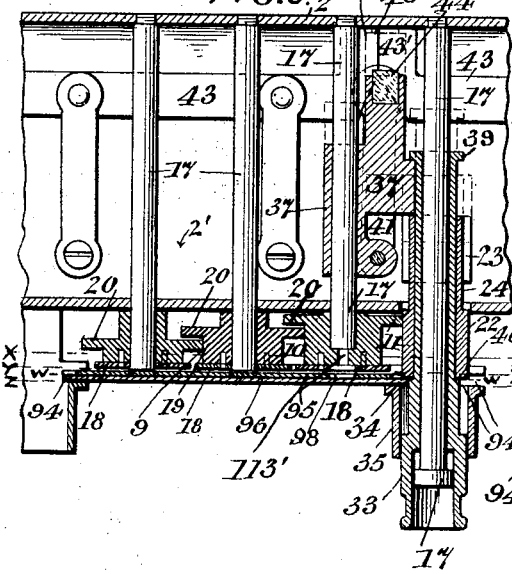
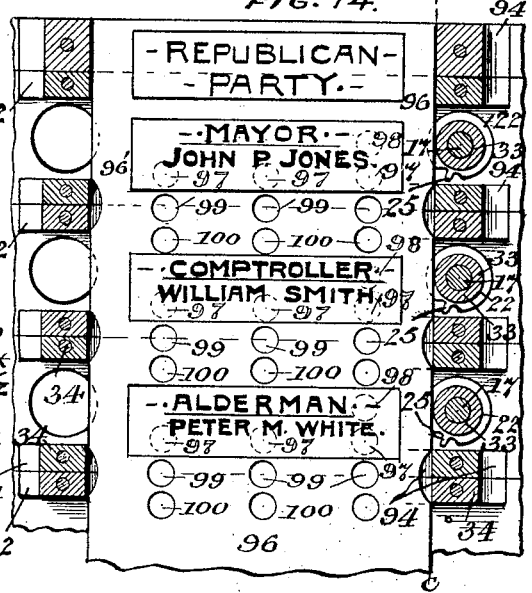
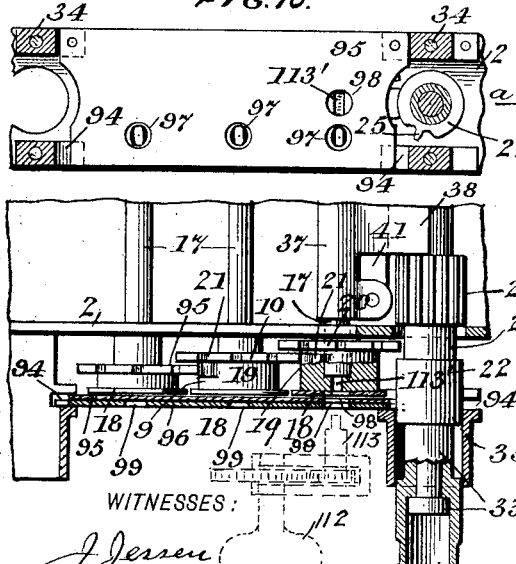
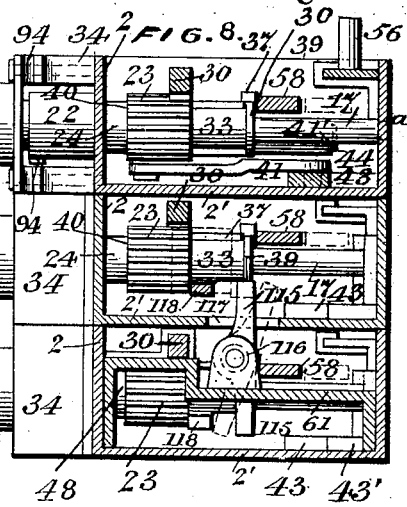
WITNESSES:
J Jessen
Richard Paul
INVENTOR
JAMES H. DEAN.
BY
Paul o Hawley
HIS ATTORNEYS.
THE NORRIS PETERS CO., PHOTO-LITHO., WASHINGTON, D. C.

No. 636,730. Patented Nov. 7, 1899.
J. H. DEAN.
VOTING MACHINE.
(Application filed Dec. 19, 1898.)
(No Model.) 8 Sheets—Sheet 5.
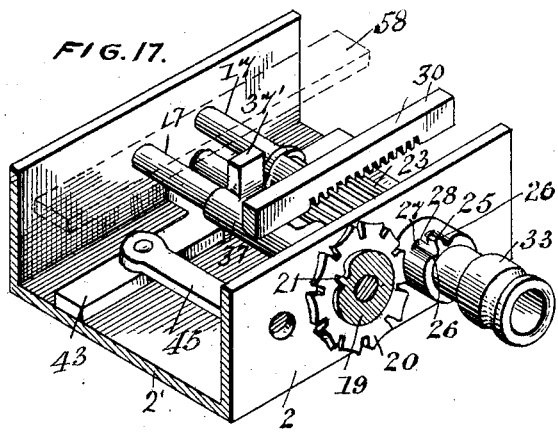
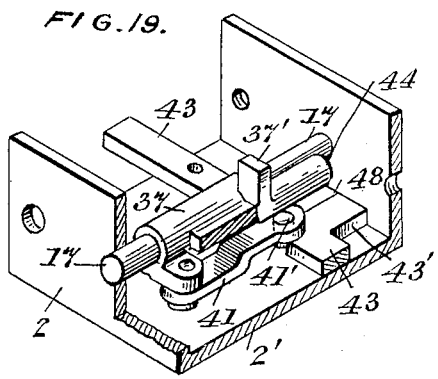
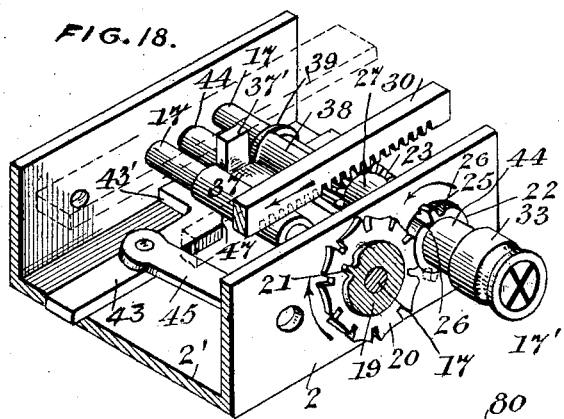
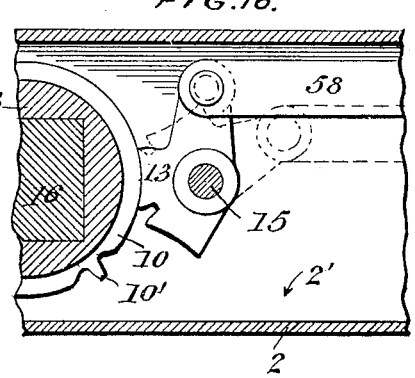
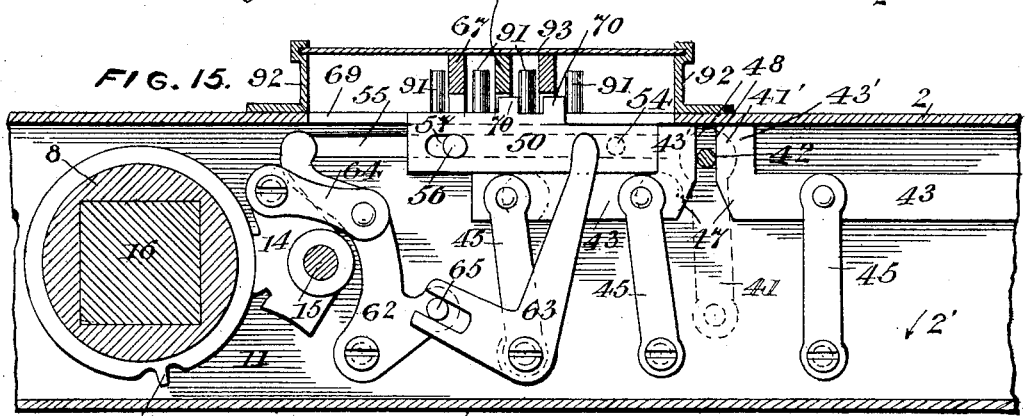
WITNESSES:
INVENTOR
JAMES H. DEAN.
BY
HIS ATTORNEYS

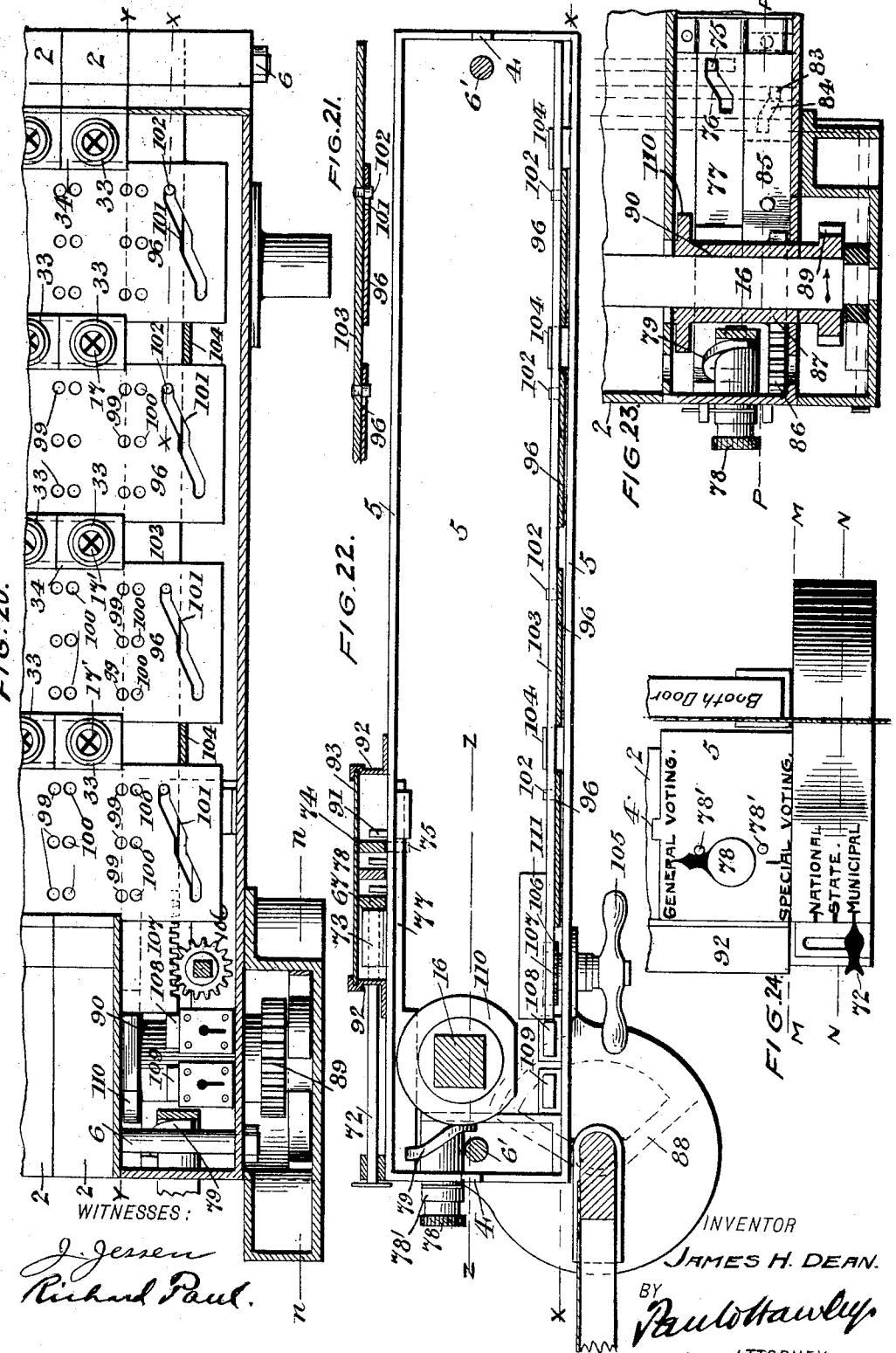

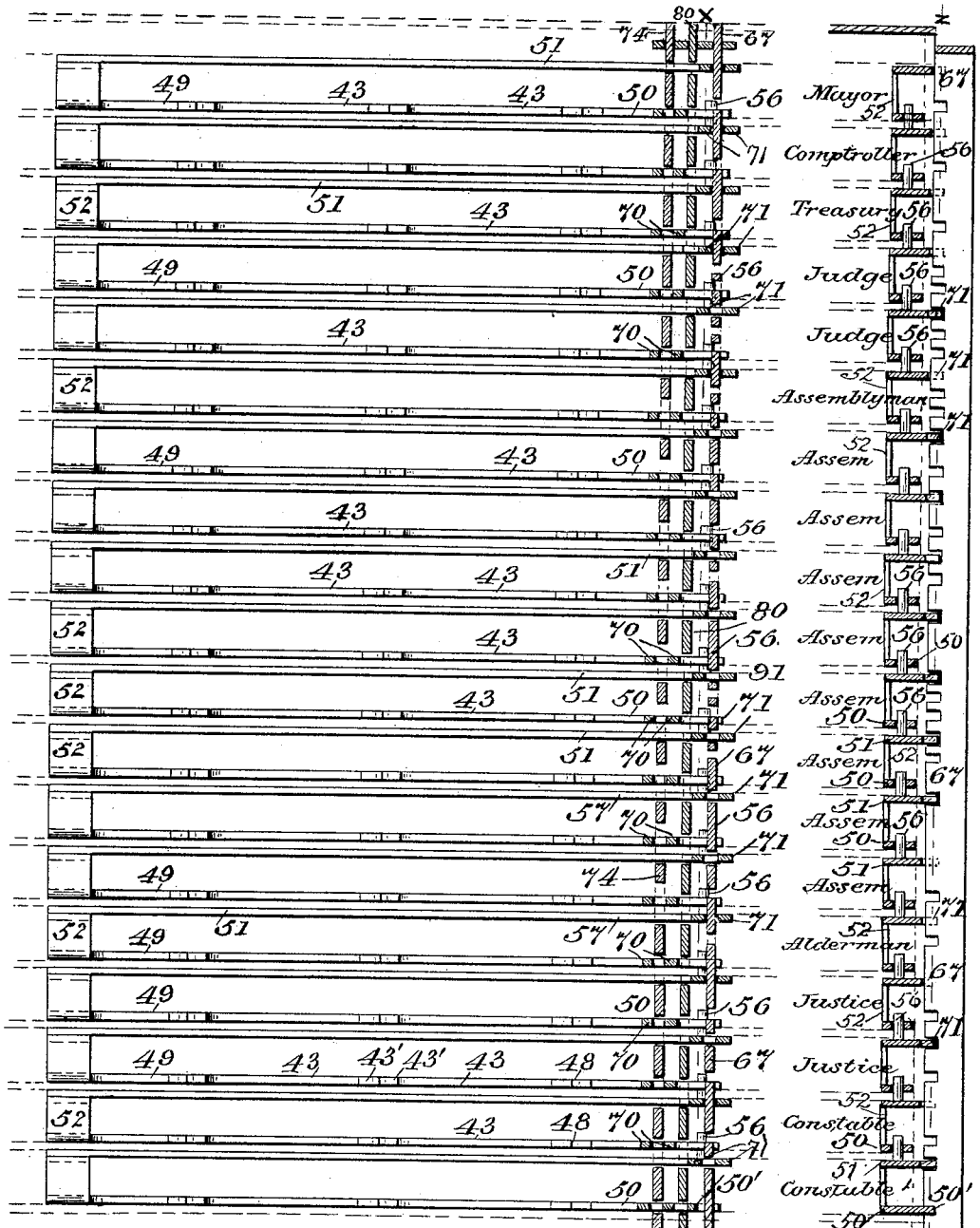

No. 636,730. Patented Nov. 7, 1899.
J. H. DEAN.
VOTING MACHINE.
(Application filed Dec. 19, 1898.)
(No Model.) 8 Sheets—Sheet 8.
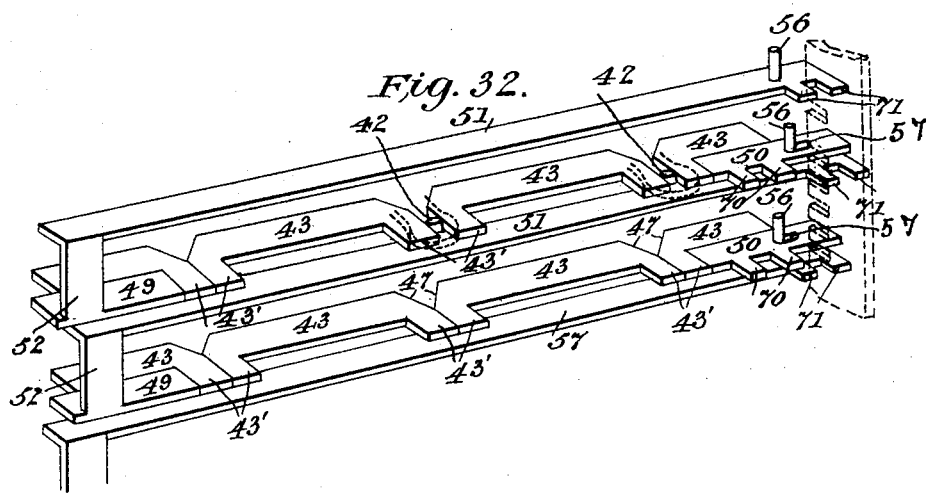
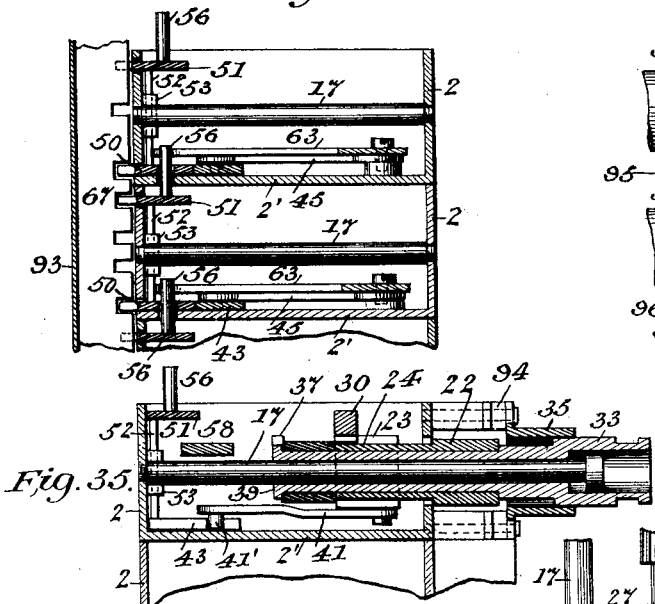
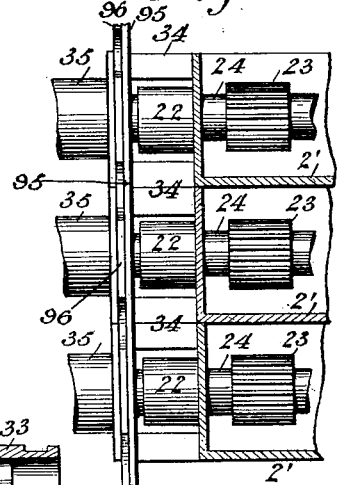
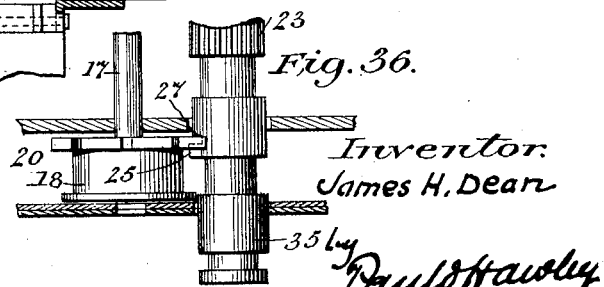
Witnesses.
Frank Keifer
H. O. Weaver
Inventor:
James H. Dean
by Paul S. Hawley
his attorneys

United States Patent Office.

JAMES H. DEAN, OF ST. PAUL, MINNESOTA, ASSIGNOR TO ROSCOE F. HERSEY AND GEORGE R. FINCH, OF SAME PLACE.

VOTING-MACHINE.

SPECIFICATION forming part of Letters Patent No. 636,730, dated November 7, 1899.

Application filed December 19, 1898. Serial No. 699,698. (No model.)

*To all whom it may concern:*

Be it known that I, JAMES H. DEAN, of the city of St. Paul, county of Ramsey, State of Minnesota, have invented certain new and useful Improvements in Voting-Machines, (Case No. 6,) of which the following is a specification.

This invention relates to voting or balloting machines that are adapted to automatically count or register the votes of successive voters who are permitted access thereto; and the invention relates particularly to improvements upon the voting-machines shown and described in Letters Patent Nos. 622,191, 622,192, and 622,193, granted to me March 28, 1899.

The objects of this invention are to simplify and cheapen the construction of voting-machines, to reduce the size and weight thereof, and particularly to render the operation of the voting-machine more positive, accurate, and reliable, and to prevent either ignorant, mistaken, or dishonest manipulation of the machine or any part thereof.

Another object of this invention is to provide a voting-machine that will be wholly free from and not dependent upon springs or gravity for the operation of its parts.

This invention also contemplates the construction of a voting-machine comprising a number of segregable independently-operable units or sections that may be assembled in any desired number to form a voting-machine equal to the requirements of any given election; and a further object of the invention is to so construct such a machine that the same may without alteration in its parts be quickly adapted for employment in different elections.

Another object of the invention is to provide a voting-machine that will permit a voter to change his ballot or retract his vote for any particular candidate without affecting the true count.

Another object of the invention is to provide simple means for positively compelling the locking of the moving parts of the machine when the count is exposed to view for the purpose of reading or taking off the returns.

The invention consists generally in a voting-machine comprising a base unit or section and a series of units or sections arranged thereon one upon the other and each representing or being provided with counters for all the candidates for a single office, said base and units together making up a machine upon which all the candidates of the several parties are represented and may be voted for, means being provided preferably in connection with said base unit for the purpose of regulating the voting operations and operating the different mechanisms in said units independently of the voting operations.

The invention consists particularly in a voting-machine made up of a number of elongated unit-frames each containing or provided with a row of counters, one for each political party, and means coupling and limiting the operation of the counter mechanisms in the different unit-frames.

The invention also consists in a peculiar construction of the counter and the means for actuating the same whereby said counter is locked against accidental operation or direct or forcible operation by a voter, but may be positively operated after a voting operation of said actuating means, all without the employment of the springs, pawls, ratchets, escapements, or gravity devices that are usually employed in counting mechanisms.

The invention also consists in the peculiar construction of the limiting mechanism whereby the auxiliary limiting devices for the different parts of the voting-machine are controlled by a simple stationary part taking the place of the complicated mechanisms heretofore employed for the purpose; and, further, the invention consists in the particular construction of the stationary part of the limiting mechanism whereby upon moving the same the machine may be changed or adjusted for a different election.

The invention further consists in various constructions and combinations of parts, all as will be hereinafter described, and pointed out in the claims.

The invention will be more readily understood by reference to the accompanying drawings, forming a part of this specification, and in which—

Figure 2:
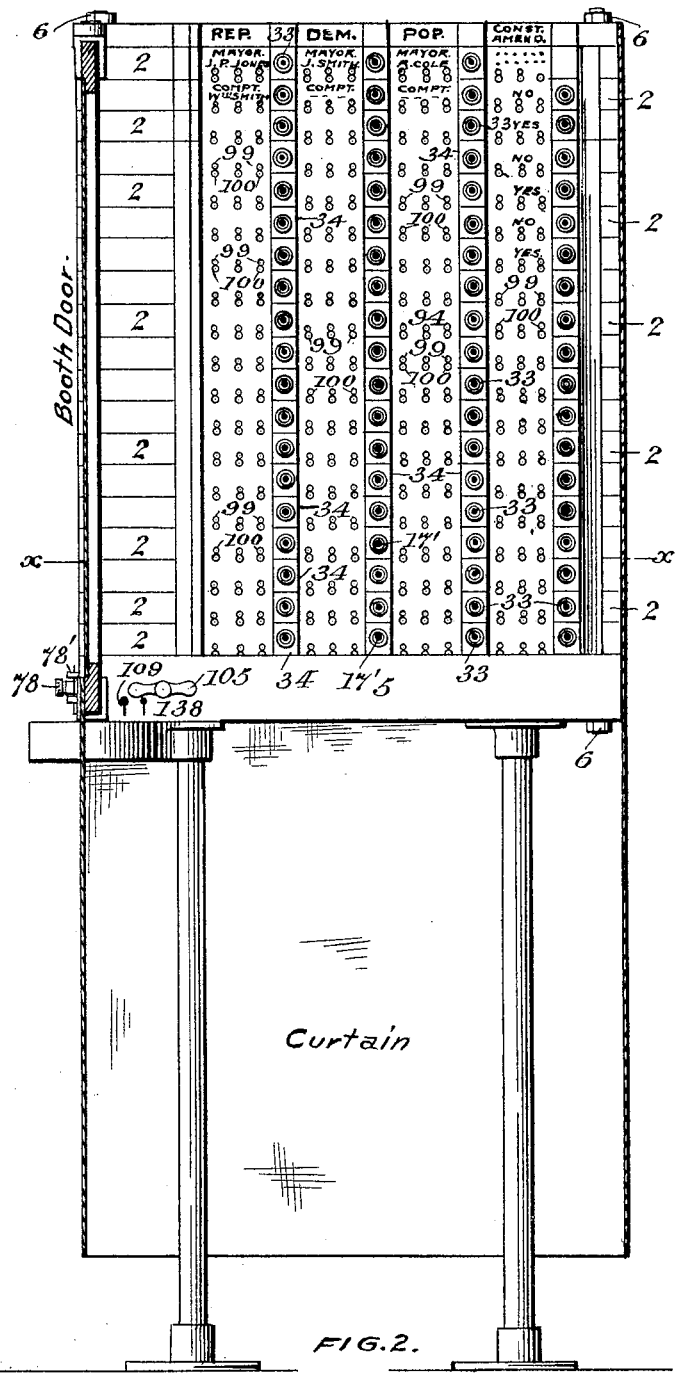

Figure 1 is a plan view of a voting machine and booth embodying my invention. Fig. 2 is a face view of the machine on the line $xx$ of Fig. 1. Fig. 3 shows the end of the machine from the position of the arrow in Fig. 1. Fig. 4 is an enlarged sectional view substantially on the line $xx$ of Fig. 2. Fig. 5 is a vertical section of one section of the machine on the line $xx$ of Fig. 4 and of another section on the line $yy$ of Fig. 4. Fig. 6 is a horizontal section on line $xx$ of Fig. 5. Fig. 7 is a vertical section on the line $zz$ of Fig. 4. Fig. 8 is a vertical cross-section of three sections arranged one above the other and upon the lines $mm$, $nn$, and $pp$ of Fig. 4. Fig. 9 is a horizontal section on the line $aa$ of Fig. 8. Fig. 10 is a vertical section on the line $ww$ of Fig. 9. Fig. 11 is a top view of the counter, with stationary parts shown in section. Fig. 12 is a vertical section on line $yy$ of Fig. 9. Fig. 13 is a section on the line $xx$ of Fig. 9. Fig. 14 is a vertical section on the line $zz$ of Fig. 9, showing the faces of several sections of the machine. Fig. 15 is an enlarged section similar to Fig. 5. Fig. 16 illustrates the operating gear or mechanism of the actuator return-bar. Fig. 17 is a perspective view showing the actuator or key and the first wheel of the counter. Fig. 18 is a similar view showing the key pushed in. Fig. 19 is a perspective view in which the actuator is removed to more clearly show the limiting-separator and its connection with the actuator. Fig. 20 is a sectional view upon the lines $bb$ of Fig. 3 and $xx$ of Fig. 21, showing the mechanism in the lower section of the machine. Fig. 21 is a detailed section on the line $xx$ of Fig. 20, showing the slide-operating bar. Fig. 22 is a horizontal section on line $yy$ of Fig. 20 and shows the top of the lower section. Fig. 23 is a partial vertical section on line $zz$ of Fig. 22. Fig. 24 is an end view of the lower section. Fig. 25 is a horizontal section on the line $pp$ of Fig. 23. Fig. 26 is a horizontal section on the line $nn$ of Figs. 20 and 24. Fig. 27 is a similar section on the line $mm$ of Fig. 24. Fig. 28 is a perspective view of one of the sections or elements of the voting-machine. Fig. 29 is a diagrammatic view of the limiting mechanism of the machine, illustrating the means that prevent more than a given number of votes by a single person. Fig. 30 is a section on the line $xx$ of Fig. 29. Fig. 31 is a perspective detail showing the connection between the wedge or transmission block of one section and transmitting-bar of the other. Fig. 32 is a perspective view of the limiting devices of two units. Fig. 33 is a vertical section on line $bb$ of Fig. 4. Fig. 34 is a vertical section on line $cc$ of Fig. 14. Fig. 35 is a vertical section on the line $aa$ of Fig. 4. Fig. 36 is a detail view of the actuator.

Most voting-machines have been constructed with the one idea of obtaining an accurate count of the votes, all other parts of the mechanisms being made secondary thereto, and in most instances of so complicated a nature as to preclude the cheap manufacture of the machine, owing to the cost of the frame and the difficulty of assembling the parts therein. Another difficulty that has been encountered has been that the machines were not freely capable of cheap interchangeability or addition of complete parts, to the end that a machine furnished to one town may be easily adapted to the purposes of a larger election or use in a different locality where different conditions prevail.

A voting-machine should be capable of several different arrangements as to its limiting mechanism, and should also be capable of easy reconstruction and the addition of complete parts or sections to keep pace with the growth of the community in which the same is used.

Many constructions of counters and actuators will not admit of a sectional or unital construction of the machine as a whole, and I find that the most important feature of a voting-machine lies in its frame and that the construction of the counters, &c., should be of secondary consideration and largely dependent upon the form of the frame. In adapting the various features and essential principles of my previous inventions to practical use I have found it desirable to follow this course and to modify the detail construction and relative arrangements of the actuators, the motive parts, and also the counters or registers, to the end that the same may be included or arranged within an element, section, or unit that will be complete in itself for all the candidates for a single office and capable of construction and use without reference to other units. These sections or units are arranged one upon the other and, with a very few parts that extend through or couple the main portions thereof and particularly their limiting devices, they constitute the complete voting-machine.

A voting-machine to be a commercial success must be capable of modification to suit the requirements of all elections that are held from year to year in the precinct or district where the machine is used, and this is only possible when the machine itself is provided with means for arbitrarily changing its groups of parts without necessitating the work of a local mechanic, with the consequent chances of error or mistake in adjusting the machine.

Most voting-machines are largely dependent upon the accuracy of their construction, lacking which failure is sure to follow, and a particular object of this invention is to provide a combination of parts which does not demand the highest mechanical exactness of construction, so that while the machine is in every way reliable it may be made at a very low cost compared with voting-machines hitherto devised. I believe also that springs and parts that rely upon gravity for their operations or actions should be entirely dispensed with in the construction of voting-machines, all parts of which should in action be absolutely positive.

At the present day the term "voting-machine" implies a mechanism that should be incapable of dishonest or ignorant manipulation, but has not yet come to mean one that is also incapable of disarrangement through the ignorance of the election officers in charge thereof, who are intrusted with the grouping of the mechanisms to prepare the machine for use in different elections from year to year.

The very simple means that I employ to insure the secrecy of the voter's ballot, the absolute and positive count of every vote, to enable a voter to retract or change a vote before his first intention or vote is recorded, the locking of the mechanism at all times to prevent manipulation, the means to prevent illegal voting or unauthorized tampering with the machine, and the construction that prevents injury to the mechanism by a voter, will all be understood from the following:

I prefer that the party tickets should appear in vertical columns upon the face of the machine. With the exception of a few parts required for locking or securing the machine each unit or section of the machine is complete in itself and could be employed alone if but one office was to be filled at an election.

*The unit-frame.*—As shown in the drawings, these sections or units are preferably arranged horizontally and one upon the other. (See Figs. 2 and 3.) The frame of each unit is preferably a shallow box, trough, or channel 2, that is preferably rectangular in cross-section, with a substantially solid bottom 2' and preferably having an open top. (See Figs. 4 to 7.) The ends of the channel are closed by end pieces 2", and said ends are provided with notches 3 and tongues 4, the tongues 4 upon one section fitting the notches upon the next section to interlock the sections or units transversely. Longitudinal movement between the unit-frames is prevented by the engagement of the sides of said tongues 4 with the shoulders 3' at the ends of the frame. (See Fig. 28.) The several unit-frames are fastened together in any suitable manner, as by means of tie bolts or rods 6 passing through the ends thereof and having locking-nuts for jamming or binding the unit-frames together and upon the base-frame or box 5, which latter will be more fully described hereinafter. The machine as a whole may be arranged upon a suitable stationary support, as shown in Figs. 1, 2, and 3, or the same may be movably arranged upon a suitable support and with relation to the voting-booth, as shown and described in a former application.

*The motor devices.*—The automatic motor mechanism for operating the mechanisms within the unit-frame comprises a part in each unit-frame, which parts are connected for operation by the movement of the machine or of the booth-door by a voter in entering and departing from the booth. I prefer to employ a compound intermittent locking-gear 8 in each unit-frame, the same being journaled in the bottom of the frame and in a box or plate 7 in the top thereof. (See Figs. 5 and 28.) As many operating-gears and locking-surfaces as are required may be provided upon this gear 8, and I prefer to employ three locking-gears 9, 10, and 11 thereon, each provided with a single tooth 9', 10', and 11', respectively, differently spaced thereon and adapted to successively operate three actuating-gears 12, 13, and 14, arranged opposite the same upon a single vertical stud-shaft 15, which is secured in the bottom of the frame 2 and in the plate 7. The locking or motor gears 8 may be interlocked or connected in any suitable manner. They are arranged one above the other in the sections or units and may have tongues and sockets for coupling the same; but I prefer to employ a shaft 16, whereon the units are adapted to be placed and which extends through all thereof and into the base-section 5, there to be connected with the support for the machine if movable or, as herein shown, with the booth-door. The specific connections employed between the booth-door and the motor-shaft 16 will be explained in connection with the description of the base-section 5, and the function and operation of the locking or motor gears and the intermittent gears 12, 13, and 14 will be described in connection with the counting mechanism.

*The counters.*—As implied by the term "channel" and as shown, the unit-frames are long enough to contain a row of counting or voting devices, one for each political party that may have a candidate for the office represented by one unit. The unit-frame contains a series of transverse rods or shafts 17, the rear ends of which are secured in the rear wall of the frame, while the forward ends preferably extend through openings or bearings in the forward wall of the frame. Four of these are provided for each individual counter. Upon the ends of three thereof I provide three counter-wheels, each of which comprises a face or dial 18, a locking-hub 19, and an intermittent gear 20, (see Figs. 9, 11, and 13,) said hubs, as shown in Fig. 13, being provided with single transfer-teeth 21. These are provided upon the hubs of the unit and tens wheels only. The gears are provided with ten teeth and are normally locked by engagement with the cylindrical surfaces of said hubs, to be moved only when the transfer-teeth arrive and mesh with the succeeding gear-wheels. It is impossible to move such counter except through the medium of the unit-wheel, and for this purpose I provide a rotary or oscillating intermittent gear, forming the counter-actuator.

*Counter-actuator.*—This device comprises the sleeve concentric with the stud next to the stud or rod 17 of the unit-wheel. On the outer end of this sleeve is the cylindrical portion 22 and upon the rear end the long spur gear or pinion 23, which parts are separated by a reduced middle portion 24. On the forward end of the cylindrical portion 22 I form the intermittent gear above referred to, the same being of the same diameter as the rest of the cylinder and having the single tooth 25, on opposite sides of which are the grooves 26 to admit the corners of the teeth upon the counter gear-wheel. These grooves are preferably about twice the length of the tooth, and square shoulders 27 are formed in the cylinder at the ends of the grooves. The rear ends of the grooves are, furthermore, separated by a short tooth 28, corresponding in shape to the tooth 25 up to the pitch-line thereof. (See Fig. 17.) The sleeve or actuator is capable of longitudinal movement by the voter to move the tooth 25 into line or register with the tooth of the intermittent gear-wheel or counter, whereupon said sleeve or actuator being oscillated said counter-wheel will be advanced one step. The counter-wheel is locked against independent movement at all times during the voting period, owing to its engagement with the cylindrical surface of the actuator, whether the latter be in its forward or inner position, and by engagement of the tooth 25 therewith when the actuator is being turned. No means are provided to compel a voter to move the actuator to the full end of its stroke inwardly, and the grooves 26 and the low tooth 28 upon the actuator are provided in view of such a case, where the tooth of the actuator should be in but partial engagement with the face of the unit gear-wheel, as shown in Fig. 36. The grooves 26 prevent the binding or jamming of the corners of the teeth of gear 20 upon the cylindrical portion 24 of the actuator, said grooves preventing interference between said parts, while the low tooth or assisting device, which is of less length than the face of the gear 20, will assist in moving the counter-wheel after the same is partially turned by the tooth 25, so that its gear-tooth has entered the groove 26. (See Figs. 18 and 36.) Further, the shoulders 28 upon the actuator prevent the actuator from being drawn out or from slipping out after the tooth 25 is turned into mesh with the gear-wheel 20 of the counter, one of said shoulders 28 engaging with the back of said wheel 20 at such times.

The actuator is rotated through the medium of the pinion upon it, all of the actuator-pinions in the unit frame or section being permanently coupled together and whether "set" or not being positively actuated by a rack-bar 30, extending nearly the full length of the section or unit and which also acts as a guide for the actuator-pinions when the keys are pushed in. This rack-bar 30 is upon its end provided with a rack 31, that is engaged by the spur-teeth 32 on the intermittent gear-wheel 12, that is operated by the motor-gear 8. (See Figs. 4, 5, 17, and 18.)

*The voter's key.*—The voter's operation of the actuator above described is accomplished by a key 33, comprising a sleeve longitudinally movable upon a stud 17 of the unit-frame and freely revoluble thereon. This key-sleeve is the carrier for the actuator-sleeve, which is journaled thereon, but cannot move longitudinally upon the key 33. The actuator-stud 17 is longer than any of the counter studs or rods, and its end extends beyond the wall or face of the unit-frame and is provided on its outer end 17' with a suitable mark, such as an X or cross. When the key is in its outer position, this X is concealed within the key, while when the key is pushed in by a voter said mark will be in plain view, forming the annunciator to show that the key has been operated and the counter set for operation. The key 33 is preferably supported at its outer end by a bracket or block 34, provided with a sleeve 35, in which the key is slidable and may also be rotated. I arrange the key for free rotation independently of the actuator in order to prevent injury to the actuator or the counter through the twisting or turning of the key by any one. The key, the stationary annunciator, the actuator, and the counter together constitute the counting or voting mechanism and are the same throughout each unit or machine section.

*The limiting mechanism.*—Each machine unit is provided with a limiting mechanism that is complete for said unit. This mechanism comprises a separator for each "candidate-counter" actuator and a series of wedge-blocks to be operated thereby. The "amendment" or "questions" counter, which I prefer to provide in each unit, is not connected with the limiting mechanism by which the other counters are controlled.

On the cross stud or rod 17 for each unit-wheel I provide a sliding block or shifter 37, having a fork or yoke 38, Figs. 5 and 18, that engages the side of the rear end of the key 33 to move therewith. The shifter 37 is freely slidable on the stationary stud 17. The fork is held against movement upon the key by a flange or collar 39 upon the end of the latter and by engagement with the rear end of the actuator-pinion 23, said actuator in turn abutting against a shoulder 40 on the forward part of said key. Each of the shifters 37 is preferably provided with a rubber buffer 44, Fig. 9, at its rear end, which latter strikes against the rear wall of the unit, which wall forms the stop for the shifter and hence for the key and the actuator. The buffer 44 prevents noise of contact and relieves the finger of the voter from shock. Each sliding block or shifter 37 has a separator-link 41 pivotally attached to its forward end, Fig. 19, to move with the key, and said link 41 is provided with a preferably cylindrical pin 42, adapted to enter between the abutting wedge or limiting blocks 43, that are preferably arranged in the bottom of the unit frame or channel.

Each section has one more wedge-block 43 than it has candidate-counter actuators, and each block is held by two links 45 45, which links are of the same length between centers as the separator-links 41 belonging to the keys. The wedge-blocks 43 are adapted to slide freely upon the bottom of the channel or frame and in their normal position are substantially in engagement with the rear wall of the section, though this is not necessary. The corners 47 of the blocks 43 are beveled, as shown, to admit the separator-pins 42, which always lie therein when the various mechanisms are in their normal positions, the separator-pin at such time being in contact with the opposite beveled ends or surfaces of the abutting blocks 43, as more fully referred to hereinafter. As best shown in Figs. 8, 15, and 19, the ends 41' of the separator-links 41 form flanges that overlap the ends of the respective wedge-blocks 43, the pin depending from the links to enter between said blocks and said blocks being held down upon the bottom of the unit-frame by the links 41, which in turn are held in position by the superimposed shifters 37. When a key is pushed in, its separator 42 will force apart the opposite wedge-block 43 and enter between the straight surfaces 48, Figs. 15 and 19, thereof, where it will remain and hold said key, unless the voter concludes to change his vote and draws back and retracts the key and the actuator, as he is free to do, owing to the absence of any means to hold or lock the key after it is pushed in. No amount of force that is applied longitudinally to the wedge-blocks will thrust the separator-pins from between the same after the pins have entered between the parallel or straight surfaces of the blocks. Further, when a key is pushed in the separator-link will be thrown out of parallel with the wedge-block links 45, and when said blocks are moved longitudinally in the channel and away from the rear wall thereof by the insertion of another separator the tendency will be to draw the separators back and draw the keys in instead of forcing them out, so that there is no danger of the accidental loss of a vote by the slipping out of a key after it is voted. It is evident, owing to the link attachment of the wedge-blocks and the link construction of the separators, that so long as the separators remain in their normal or unvoted position longitudinal movement of the wedge-block will not disturb or change the exact relations of the separators thereto, the deflection of the separators from the perpendicular to the plane of the face of the unit-frame having no effect upon the entrance of their pins between said blocks when the keys are pushed in, owing to the differential or the swinging movement permitted. As in multi-candidate groups, hereinafter described, the wedge-blocks have considerable movement or must be thus adapted. The corners of the wedge-blocks have a bevel of about thirty degrees, which will insure the easy slipping of the wedge-pins or separators thereon when corresponding keys are forced in, even when there is a large degree of deflection of the separator-links, thus avoiding all binding between the parts which might deceive a party as to his right to use a particular or chosen key. The separator-pins 42 never leave the V's formed between the bevels of the blocks 43, which blocks swing the separator-links from side to side as they move, the whole system or limiting mechanism being flexible to this extent. To reduce friction and lighten the blocks 43, the rear sides thereof next to the rear wall of the unit-frame are recessed or cut away, leaving only the rearwardly-extending arms 43'. By limiting the possible movement of the wedge-blocks it is evident that I may limit the number of keys that may be operated by a voter, for when the wedge-blocks are locked it is impossible to force a separator between the closely-abutting ends of said blocks. For limiting or controlling the movement or travel of the blocks 43 and the associated keys the machine as a whole is provided with a simple mechanism of any desired construction to coöperate with stop-blocks 49 and 50 and a transmitting-bar 51, that I provide in each unit, these parts in the different sections being preferably connected. The blocks 49 and 50 abut against the end blocks 43, preferably occupy the recessed portions of said blocks, and are preferably capable of longitudinal movement only, but in either direction, within the unit-frame. The block 49, Fig. 32, is connected to the bar 51, which latter is in the top of the unit, by a depending strap 52, which, if desired, may be integral with the block 49 and is slidable in a guide or strap 53, Fig. 6, secured on the rear wall of the channel or frame 2. The block 50 is provided with a guide-pin 54, Figs. 7 and 15, entering a guide or slot 55 in the bottom of the unit-frame. Each transmitting-bar 51 is provided with a pin or lug 56, projecting upwardly therefrom to enter the unit above the same. This pin passes through the slot 55 in said unit-frame and also through a short slot 57 in the block 50. (See Figs. 6, 7, 15, 31, and 32.) The block 50 in each section needs no other guide than its own pin 54 and the pin 56, belonging to the transmitting-bar 51 in the section or unit beneath. The limiting mechanisms of the units are thus, through their pins 56 and blocks 50, connected throughout the machine or assemblage of units by the mere act of placing the units together. (See Figs. 15, 33, and 32.)

The slot 57 in the block 50 of the unit is equal in length to the diameter of a connecting-pin 56 plus the diameter of one separator-pin 42, which latter are of the same diameter or size throughout the machine. The movement imparted to the wedge system by the pushing in of a single key with its separator is equal to the diameter of a wedge-pin 42. Such a single movement will be hereinafter termed "one step." This limited freedom of movement or lost motion between the limiting mechanisms of adjoining units permits the voting of one key in a unit when both the block 50 and the bar 51 thereof are locked against movement, as is the case in a unit representing a single office not in a multicandidate group, or, as it may be better termed, "multi-office" group. The means for locking or limiting the movement of such parts and the grouping of several machine units will be explained hereinafter.

*The means for returning or resetting the separators, keys, and actuators.*—The key, the actuator, the sliding block, and the separator-link move together. Each sliding block 37 is provided with a lug 37', Figs. 4, 5, 8, 17, 18, and 19, and each unit has a longitudinally-extending rod or bar 58 to engage all of the lugs or shoulders 37' to lock the same in their forward positions and to return any thereof that may have been pushed in by a voter. This bar may rest upon the studs or cross-rods 17 and is adapted to move back and forth thereon, as well as longitudinally, being pivotally connected upon parallel links or arms 59 and 60 at opposite ends of the unit-frame. (See Figs. 4 and 5.) The link 60 is pivoted upon a cross-bar or bridge 61, which also forms a guide for the outer end of the rack-bar 30. The other link 59 is integral with the irregular gear 13 and is centered upon the short shaft 15 therewith. The irregular or intermittent gear 13 has an oscillating action only to operate the locking and returning bar 58, to either lock or free the keys, and said gear 13 is locked by engagement with the surface 10 of the motor-gear 8, the rod 58 being incapable of movement except by said gear 8, the tooth 10' of which operates the irregular gear 13.

*The means for resetting and locking the wedge-blocks.*—The withdrawal of the separators from the wedge-blocks permits the same to be returned or reset. For this purpose it is necessary to provide means to return the blocks from or at both ends of the series. The bar 51 and the movable block 49 are provided in each unit in order to adapt every unit to universal application in voting-machines—that is, to adapt every unit for association with another unit or units to complete a multicandidate group. A single unit to be used independently of others would not require a transmitting-bar 51 or a block 49, and in a complete machine those units that are used separately for single offices have their transmitting-bars positively locked against movement. I find it convenient, therefore, to provide each unit with means to positively return its wedge-block and the transmitting-bar 51 and the block 49 of the next underlying unit rather than to engage and return the bar 51 in the same unit. These operations are accomplished by means of the intermittent gear 14 and the bell-cranks 62 and 63. Said gear 14 is adapted to be operated by the tooth 11' of the surface 11 on the motor-gear 8 and is locked in both of its positions by engagement with said surface 11. The bell-crank 62 is connected with the gear 14 by a link 64, and the bell-cranks 62 and 63 have a toggle connection 65, comprising a slot and pin, as shown in Figs. 6 and 15, whereby upon operation of the gear 14 the free arms of said bell-crank are moved toward one another to respectively engage and return the block 50 and the pin 56 of the underlying transmitting-bar in the next unit, which operation being repeated or occurring simultaneously in all of the units results in forcing the blocks 50 and 49 against the interposed series of wedge-blocks 43 to return the same to their normal positions and lock the same against separation by the key-separators 42. A reverse movement of the gear 14 causes the separation of the free arms of the bell-crank, carrying the same away from the blocks 50 and the pin 56 to permit movement thereof. (See Fig. 15.)

It is important, or at least preferable, when the wedge-blocks are returned or forced together after the keys have been moved out or forward that the pins 42 should be in engagement with said blocks and that the forward centers of the separator-links should be in line with the centers of the wedge-block links 43, and I therefore prefer that the final forward movement of the keys to a slight degree shall be accomplished by the wedge-blocks 43, the separator-pins 42 being caught between the inclined or beveled ends of said blocks and forced forward with the keys irrespective of the returning-bar 58. The bar 58 is thus practically relieved from the office of locking the keys and actuators, pressure upon the keys being taken by the wedges 43. I thus avoid the necessity for accurately adjusting the bar 58 and avoid the possibility of lost motion between the keys, separators, and wedge-blocks, which, if extended, might permit the operation of an extra key by a voter. The foregoing is true except with relation to the amendment-key, (see Figs. 4, 5, and 16,) which has no connection with the wedge or limiting devices and is both returned and locked by the bar 58. The engagement of the amendment-key through the lug 37' with the bar 58 is at a point close to the end thereof, so that the maximum strength of the bar is available for locking the key, while if said bar was relied upon to secure the other keys of the unit it would be necessary to make the same considerably stronger.

*The grouping mechanism.*—Without means to lock or limit the movement of the stop-blocks 49 and 50 it would be possible for a voter to operate every key in a unit, a greater relative movement of said blocks being provided for in each section. This must be prevented where the unit represents the only office of the kind to be filled at the election, while the operation of a given number of keys selected from a multicandidate group comprising all the keys in two or more units must be permitted. A multicandidate group will include as many units or machine-sections as there are offices of one kind to be filled. It is necessary, therefore, to provide means whereby the units composing a voting-machine may be properly grouped, and this mechanism pertains to and operates in conjunction with the blocks 50 and the transmitting-bars of all the units. I may provide devices upon the different sections to be interlocked or associated when the sections are placed together; but I prefer in the present machine to employ a simple bar 67, provided with a number of notches that permit the movement of the block 50 and the transmitting-bar 51 and having solid portions that may be employed to stop, limit, or interrupt such movement. In each unit-frame there are two slots 68 and 69, Figs. 4, 6, 7, and 15, through which project two lugs 70, Figs. 4, 7, and 31, upon the block 50 and two lugs 71 upon the bar 51, respectively. The blocks 50, so far as the lugs 70 are concerned, are free to move irrespective of the bar 67, Fig. 15, it being assumed that there is sufficient space between the first of said lugs and said bar to permit the maximum number of steps in the movement of said block 50 without interference with the bar 67. The office of said bar is to lock the transmitting-bars 51, as best shown in diagram Figs. 29 and 30. The solid portions of the bar 67 enter between the lugs 71 of those transmitting-bars which are in units representing single offices, and in the first unit of a multicandidate group of units the intermediate transmitting-bars of the multicandidate group being free to move through notches in said bar 67. From this arrangement it follows that the transmitting-bar of a single-office unit will be locked, as will also the transmitting-bar of the next unit beneath. The single step required in a single-office unit is permitted by the slot 57 in its block 50. The only exception to the foregoing is found in the last or lowest unit of the machine, in which I prefer to provide the block 50 with a third lug 50', adapted to engage the bar 67 after one step of the wedge-block and the block 50, there being no pin 56 to otherwise engage and limit the movement of said block 50. The units are all constructed to permit their use in the largest multicandidate group to be found necessary in any locality and are therefore capable of use in machines furnished where the multicandidate requirements are less than or within the maximum number.

In Figs. 29 and 30 I have illustrated the manner of connecting the limiting mechanisms of a voting-machine, comprising nineteen units for the election of a mayor, a controller, a treasurer, two judges, nine assemblymen, one alderman, two justices, and two constables. It will be noted that in each group the intermediate transmitting bar or bars are not locked by the bar 67, but operate in notches therein. A single step is allowed in each locking-block 50; but in a group two steps communicated to the locking-block by the operation of two keys in one unit would cause the transmission of one of said steps through the bar 51 of the next unit to the block 49 of the latter and through the same to the wedge-blocks 43 thereof, causing the block 50 of the second unit to advance into engagement with its transmitting-bar pin 56, Figs. 15 and 31. If as in a two-unit group the transmitting-bar of the third unit was locked by the bar 67, it is evident that the pin 56 of the second unit would be incapable of movement, and it would therefore be impossible to force in a third key selected upon either of the first two units. If instead of operating two keys upon the first section of this group the voter should select one upon each, it is evident that the free motion between the stop-blocks 50 and the fixed or locked pins 56 would all be taken up, and it is likewise evident that if two keys were operated in the second unit one step of the wedge-blocks would be made in each direction, thereby operating or drawing back the bar 51 of said second unit to engage its pin 56 with the block 50 of the first unit to positively lock all of the edge blocks in said first unit, which at the opposite end are locked through the medium of the already-locked transmitting-bar 51 belonging to said first section. It follows that the single step provided for in each unit may be used or taken up therein or in another unit that has its limiting mechanism coupled therewith. Thus in the nine-office multicandidate group the nine free steps may all be taken up by nine votes upon one ticket represented by a vertical row of keys upon the face of the machine or by the promiscuous voting of any nine keys within the nine units or tiers upon the face of the machine. It will be understood that in the latter case the transmitting-bars will some of them be projected either to the right or to the left, or both, without interference with the locking or grouping bar 67.

It will be seen from the foregoing that the groups depend upon the notches in the locking-bar 67, and by providing two or more sets or combinations or arrangements of said notches and the intermediate solid portions of the bar I am able by a slight movement of the bar transversely of the units to quickly and without chance of error alter the grouping arrangement, and thus adapt the voting-machine as a whole to use in an election where a different combination of offices are to be filled.

In most localities of this country three or more different elections are held during succeeding years, and this machine, which will contain the maximum number of units required in the largest election, is fitted with a locking-bar 67, constructed in accordance with the different requirements of all the elections. As illustrated in Figs. 1, 22, 24, and 29, I prefer to provide an indicator 72 and a suitable lock 73 in connection with the bar 67 to facilitate the adjustment thereof and to lock the same against interference by electors. This lock is preferably arranged in the base-section of the machine, and the key thereof is preferably held by an officer other than an election officer to prevent manipulation by election judges or clerks.

*Class voting.*—In addition to the locking-bar 67, that is moved practically but once a year, once for each election, I provide a special-class locking-bar 74, that is normally out of engagement with the limiting mechanisms, but has solid portions adapted to engage the lugs 70 of the stop-blocks 50 belonging to those units or tiers that it is desired to lock out when a special-class voter enters to cast a ballot. This bar may, like the bar 67, have two or more series of notches adapting it and the machine to different elections in which different offices are to be voted for by electors of special class. Fig. 29 illustrates a special-class bar 74 adapted to lock out units that represent the assembly offices. For operating the special-class bar I provide said bar with a pin or lug 75 (see Figs. 22 and 23) at its lower end, extending through a slot in the rear wall of the base-section and engaged in a cam-slot 76 of a sliding bar 77 in said base, which bar is adapted to be operated by a knob 78 upon the end of the machine, which knob is visible from the outside of the booth. The connection between the knob and the bar is preferably made by a worm-thread 79, that engages said bar. (See Figs. 22 and 23.) The knob is provided with a pointer, for which there are stop-pins 78' on the end of the base. (See Figs. 23 and 24.) This knob is operated by the election-officer when a special-class voter enters the booth and normally stands at the point marked "General voting," with the bar 74 disengaged from all the limiting mechanisms. The movement of the limiting mechanism by one key will lock the bar 74.

*Machine-locking bar.*—For the purpose of positively locking the machine against operation independently of the mechanisms that are included within the different units there is still another bar arranged with the bars 67 and 74. This bar 80 need have but one series of notches, the same being wide enough to permit the free movement of the limiting mechanisms. I prefer to arrange the bar 80 between the bars 67 and 74, and the same is of such width as to engage the adjacent lugs upon both the blocks 50 and the transmitting-bars 51 throughout the machine, when the bar is moved to interpose its solid portions between said lugs, thus positively locking all parts of the limiting mechanism, with the wedge-blocks firmly pressed together to prevent the forcing in of any key. There is a lock 81, preferably in the base-section, having a bolt, (see dotted lines, Fig. 29,) whereby the bar 80 may be secured in the locked position. The key for this lock is in the possession of the election officer. Several locks may be provided therefor to require the coöperation of several persons to render the machine operative after it is delivered at the polling-station in a locked condition. I prefer that this locking-bar shall be operated every time that a voter enters and departs from the booth to lock the machine, except when a voter is before the same and concealed within the booth. As before stated, the locking mechanism may be actuated either by the movement of the machine bodily or by the movement of a lever which to the extent of this operation includes a movable booth-door for the booth. Either of these operations is made to impart movement to the bar 80 through the medium of a lug or pin 83 (see Fig. 23) upon the lower end of said bar and engaged in a cam-slot 84 of the siding bar 85, that is operated by a rack and gear 86 87 upon said bar and the main vertical shaft of the machine. (See Figs. 23 and 25.) The cam-slot is such that the limiting mechanisms (wedge-blocks and transmitting-bars) are only locked and unlocked upon the final movements of the machine or of the door in its two directions to prevent manipulation of the keys, as permitted after complete operations of the units mechanisms.

*Full-stroke device.*—I prefer to provide a full-stroke mechanism in connection with the main operating member or shaft of the machine to compel complete movements of either the machine or instead the booth-door. Any suitable full-stroke device may be employed. I have illustrated such a mechanism in Figs. 26 and 27, the same comprising a double pawl or escapement to engage the differential gear 88 upon the booth-door or upon the central support of the machine and by which the connection is made with the pinion 89 upon the main driving or motor member or shaft 16. By means of the differential gear or gears 88 89 the unit-operating parts are accommodated to any degree of movement that is adopted for the movable machine or the booth-door. I prefer to arrange the gear 87 and the pinion 89 upon a sleeve 90 in the base, (see Figs. 20, 22, 23, and 25,) and which sleeve fits upon the shaft 16 after the manner of the locking or motor gears 8, before described.

I prefer to provide guide studs or lugs 91 upon the back of each section or unit to guide the locking-bars 74, 80, and 67, and each unit is also provided with brackets or guides 92 to receive a cover or slide 93, passing through all thereof to conceal the locking-bars and protect the same from injury, Fig. 22. This slide is preferably provided with a lock (not shown) to secure or fasten it.

*The means for concealing the counters.*—The counter-dials are all in substantially the same plane or flush with one another upon the face of the machine. The sleeve or key supporting blocks or brackets 34 upon the unit-frames appear in vertical lines upon the face of the machine as a whole and have vertical grooves 94 to receive two sets of slides or covers for the counters. The slides are arranged vertically, and the inner slide 95 of each pair is permanently secured after the units have been assembled. The outer slide 96 is movable. The inner slide is provided with a horizontal series of holes 97 (see Figs. 9, 10, and 14) for each counter, so that a counter will show but a single set or row of figures. The inner slide 95 is also provided with a hole 98 before the center of each unit-wheel to receive a suitable tool used in turning the counters back to zero. The outer slide 96 is provided with two sets or series of holes 99 100 for each counter that the slide covers. The distance between centers of the holes 99 100 is the same as between holes 97 and 98 on the inner slide. The position of the outer slide 96 is normally as shown in Figs. 14 and 9, the holes therein being out of register with those in the inner slide, the counters being concealed by the solid portions of the slide 96. When the slide 96 is raised, the holes 99 are made to register with the holes 97 of the slide 95 to expose the counter to view, and when the slide is still further raised the holes 99 will be moved opposite the holes 98 of the unit-counters, while the holes 100 will be made to register with the counter-figure holes 97. In the latter position access may be had to the counters to return the same to zero while the same are exposed to view. I term the slides 96 "party" slides or shutters. These are changeable for each election, preferably a separate set of party slides being provided for each election. The party name or emblem I prefer to engrave or otherwise make permanent upon the head of the slide, and the names of the officers are preferably also permanent thereon. The names of the candidates may be painted or placed upon paper pasters affixed to the slide.

*Operation of counter-slides.*—The base 5 is preferably wider than a unit frame or channel, the face thereof being preferably flush with the faces of the blocks or brackets 34 upon the units. The lower ends of the slides 96 project below the lowest unit of the machine and into the base 5. At the lower end each is provided with a two-step cam-slot 101, Fig. 20, having three flat or straight portions and to receive a pin 102 upon a sliding bar 103, that is arranged in the base 5. Said bar has suitable bearings or guides 104. For operating the bar 103 I provide a handle 105 upon the face of the base and having within the base a pinion 106, meshing with a rack 107 upon the bar 103. Two stop-blocks 108 and 109 limit the movement of the bar 103. The bolt of the lock 108 is engaged with the end of the bar 103 when the slides 96 are in their lower position, concealing the counters. The key of this lock is in the hands of the election officer, who after withdrawing the bolt of lock 108 may draw back the bar 103 by means of the handle 105, and thereby lift or raise the slides 96 to disclose or expose the count for each candidate represented on the face of the machine and for the votes upon amendments, &c. The election officer's movement of the bar 103 is limited by the bolt of the lock 109 and he is unable to draw the pins 102 farther than the middle flat of the cam-slots 101—that is, the election officer cannot expose the arbors or centers of the unit-wheels of the counters. After exposing the counters the election officer may, if he desires, return the slides to conceal the counters. If desired, means may be provided to prevent more than a single operation of the slides by the election judge or officer. It is desirable that the actuators and keys be locked positively during the time that the counters are exposed to view, and for this purpose I provide a flat-sided cam or wheel 110 upon the lower end of the shaft 16. (See sleeve 90, Figs. 20, 22, and 23.) This cam is so arranged that the bar 103, which has a block 111 upon its inner side, cannot be moved back except when the locking-gears 8 in the different units are in position to positively lock all of the voting-keys thereof. The key of the lock 109 is preferably held by a person not directly in charge of the voting-machine, it being intended that this lock should be withdrawn only when it is desired to reset the machine and turn its counters back to zero. When the key is turned in lock 109, the bar 103 may be drawn back to accomplish the second step or lift of the slides 96 to at once expose the figures upon the counters and the arbors of the unit-wheels. The edges of the slides 96 form stops (see Figs. 9 and 14) in the guides 94 to normally prevent the keys from being drawn out of the units beyond the point to which they are projected by the final closing action of the wedge-blocks above described. It is obvious that so long as the cylindrical surfaces of the actuators upon the keys are in engagement with the peripheries of the unit-wheels said wheels cannot be turned, and it is therefore necessary that the actuators be further drawn out to disengage the actuators from the counters. (See Fig. 11.) To permit this, the edges of the slides 96 are provided with notches 96', Figs. 14 and 11, which upon the second step of movement of the said slides are moved opposite the keys, whereupon the keys and actuators may be disengaged. The forward ends of the shifters 37 may and do serve to prevent the keys from being so far drawn out as to withdraw the separator-pins 42 from the V's between the wedge-blocks 43 to avoid possible derangement of the limiting mechanisms. This outward movement of the key carries the reduced portion 24 of the actuator opposite to the gear-wheel of the unit-counter, whereupon said wheel and the others may be freely turned to reset the same with the zeros of all opposite the holes 97 of the inner slide. For turning back the counter when it is disengaged from the actuator I prefer to employ a geared-up key 112, the arbor 113 (see dotted lines, Fig. 11) of which is adapted to be inserted into a suitable socket 113' in the unit-wheel through the holes 99 and 98 of the two slides 96 and 95. After the counters are returned to zero the keys may be pushed in again until stopped by the wedge-blocks and to carry the outer ends of the actuators to points back of the slides 96, whereupon said slides may be returned to conceal the counters and again act as stops for the keys. It is evident that neither slide can be returned unless all of the actuator-keys upon opposite sides thereof have been returned, and as the slides are connected by the bar 103 none of the slides may be returned unless all of the keys have been reset. It follows that the bar 103 cannot be moved until this operation has taken place, and as said bar, through the medium of cam 110 and gears 8, serves to lock the limiting mechanisms it is also obvious that the keys can none of them be operated or actuators worked to record votes until the counters are concealed. The amendment-actuators are secured by the respective locking-bars 58 in the same manner until the counters are concealed. It follows from the construction of the cam-slots of the slides 96 that said slides are locked at all times against movement by any other means than said bar 103 as distinguished from the operation of a catch or latch that might be provided upon said bar to engage the slide or slides.

*The pairs of amendment-keys.*—Each section is provided with one "amendment" voting mechanism. These are arranged one above the other in the different sections or units, two thereof being provided for every question to record the "yes" and "no" votes upon the amendment or question submitted to the voters. As the voting mechanisms in each pair are in different sections, it is desirable to provide some means of communication between such sections or units to lock or move out one amendment-key when the other is voted. Instead of employing a mechanism similar to the wedge-blocks I prefer to provide every other unit, beginning with the second in the machine, with a short upright lever 115, (see Figs. 4, 5, and 8,) preferably pivoted upon a lug 116 on the bridge-piece 61 of the frame. The other units are provided with slots 117 in their bottoms to admit the upper ends of said levers 115, and in both of the units the sliding block or shifter 37 is provided with a lug 118, preferably upon the lower arm of the shifter jaw or fork 38. These lugs are normally held out of engagement with the rocking lever 115, as shown in Fig. 8; but when one of the keys of the pair is pushed in to move the actuator into the operating position said lever 115 will be rocked or shifted against the lug 118 that is movable with the other key. Thus the lugs upon both keys will be engaged with the rocking lever. If the voter desires to change his vote, he may push in the second key, and thereby, through the lever 115, return or retract the first one. Neither actuator can be placed in operative position unless the other is in an inoperative position. It is thus made impossible for a voter to cast both "yes" and "no" votes upon one question or amendment.

*Economy in weight, space, and finish.*—In the construction of voting-machines weight is an important point for consideration, inasmuch as the cost of the machine is largely controlled by and proportional to the weight. Further, ease of transportation is dependent upon the weight of the machine. Further, large and heavy parts require a great deal of space. The other points for consideration are the finish of the parts—that is, the degree of accuracy required in the formation thereof, and, further, the question of a comparative cheapness and ease of assembling the various parts.

In order to cut down the weight of a machine, it is necessary to cut down the size and relatively the strength of the parts, and it follows that the machine will be both smaller and lighter. To further reduce the size of the machine and its weight, care must be observed as to compact arrangement or assemblage of the parts, extra frame parts being avoided wherever possible by adapting the operating devices to in part at least take the place thereof and for easy and quick arrangement in whatever frame is employed, the latter having direct bearing upon the question of cost. The operating relations of the parts determine the strength required generally, as well as the accuracy of finish and expense of construction.

This voting-machine is reliable because every part is itself or is moved by a positively-actuated part, so that except in case of an actual breakage the machine must operate as intended. When the face of the machine is exposed, either on account of the opening of the booth-door or movement of the machine, as provided for in my former application, the teeth of the actuators will be in the position shown in Figs. 8, 12, 13, and 14 and the actuators and keys will be in their forward position. When a voter enters the booth, the shaft 16 will be partially rotated to successively carry the teeth 9, 10, and 11 of the gears 8 into engagement with their corresponding locking-gears 12, 13, and 14 to successively shift the bar 30 and to return the actuator-teeth to the upper positions, to throw back the bar 58 and release the keys, and shift the bell-cranks 62 and 63 to release the limiting mechanism. The voter then may push in the keys representing the candidates for whom he wishes to cast his ballot, being prevented from overvoting by the limiting mechanism and permitted to change his vote by retracting-keys, as above explained. When a voter finishes his ballot, he passes out of the booth, and in doing so either moves the booth-door or the machine, or the judge may operate a lever to accomplish a return movement or oscillation of the gears 8 to successively rotate the actuators, thereby operating the counters for which actuators have been set, throw back the bar 58 to return the keys actuated and separated, and return the bell-cranks 62 and 63 to reinstate the limiting mechanism and accomplish the final movement of the keys. When the election is over, the judge exposes the counters of the machine, and in doing so locks the gear-wheels 8 through the medium of the bar 103 and the cam 110, thereby positively locking all the voting mechanisms. It should be stated here that this arrangement permits the election officers to inspect the counters before the election as well as after without enabling or allowing any manipulation of the counters. Before the next election the city clerk or other officer having the keys of the locks 73 and 109 will unlock the same to permit the necessary change in the position of the locking or grouping bar 67 and also permit the movement of the slides 96 and the return of the counters to zero to prepare the machine for the next election.

It is believed that the detailed operation of the mechanisms will be understood from the foregoing specification without further explanation thereof.

It is obvious that my voting-machine admits of numerous modifications in its construction, all of which can be made without departing from the spirit of my invention, and I therefore do not confine the same to the specific construction herein shown and described.

Having thus described my invention, I claim as new and desire to secure by Letters Patent—

1. A voting-machine composed of a series of three or more elongated unit-frames or channels each containing a row of voting mechanisms, and constituting a unit, and means extending through said frames or channels transversely thereof concealed therein and for controlling the operation of the mechanisms therein, substantially as described.

2. A voting-machine having its frame composed of interlocked single-office frames, having interlocked intermeshing parts and each containing a complement of voting mechanisms for candidates for the same office and therewith constituting a machine unit, substantially as described.

3. A voting-machine comprising a series of segregable units each containing a complete complement of voting mechanisms for one office that may be assembled in any number according to the requirements, and the frames of which resting one upon the other and suitably interconnected, constitute the frame of the machine as a whole, substantially as described.

4. In a voting-machine, comprising a suitable base unit containing the controlling mechanisms and a series of segregable office units, the first of which is engaged with and attached to said base unit, while the remaining office units are engaged with and attached only to one another.

5. A voting-machine composed of a series of segregable machine units comprising a frame and voting and limiting mechanisms and each representing a single office, the frames of said units resting one upon the other and being suitably connected to form a rigid structure thereof, and means within the units for interconnecting the limiting mechanisms, and means for grouping said units according to the requirements for multicandidate voting, substantially as described.

6. A voting-machine composed of a series of segregable machine units, each comprising a frame and voting and limiting mechanisms and each unit devoted to a single office, and the frames of said units resting one upon the other and being suitably connected to form a rigid structure thereof, and means with the units interconnecting the limiting mechanisms, and means grouping the limiting mechanisms of said units, substantially as described.

7. A voting-machine composed of a series of segregable machine units, each comprising a frame and voting and limiting mechanisms and each unit devoted to a single office, and the frames of said unit being suitably connected to form a wholly rigid structure or machine-body thereof, means interconnecting and grouping the limiting mechanisms of said units, and independent locking and grouping means controlling their operation, substantially as described.

8. In a voting-machine composed of a series of suitably-connected single-office segregable units, each comprising a frame and voting and limiting mechanisms and the limiting mechanisms of which are interconnected by the act of assembling the units, and the frames of said units constituting the frame of the machine, substantially as described.

9. A voting-machine composed of a series of suitably-connected single-office units, each comprising a frame having within it complete voting and limiting mechanisms for a single office and the mechanisms of which are rendered inoperative by the act of assembling the units, the limiting mechanisms of the units being thereby engaged one with the other, and means dividing the body or series of units into single and multicandidate groups, substantially as described.

10. A voting-machine composed of a series of suitable single-office units the mechanisms of which are adapted for interoperation, and means in each unit for interengagement with corresponding parts in adjoining units for connecting two or more single-office units by the act of assembling the same, into a multicandidate group, substantially as described.

11. In a voting-machine composed of a series of suitably-connected single-office segregable units, each comprising a frame and voting and limiting mechanisms, and the limiting mechanisms of which are interconnected by the act of assembling the units, substantially as described.

12. A voting-machine comprising a series of separable units, each representing a single office and containing or provided with a definite number of voting mechanisms for regularly-nominated candidates for such office, each also provided with means to prevent more than a given number of votes thereon by one voter, and the machine being completed by the assemblage of said units, the party tickets extending transversely of said units, grouping means and means for operating said voting mechanisms after the votes are cast by successive voters, substantially as described.

13. A voting-machine comprising a series of separable parts, each devoted to a single office, and containing or provided with a definite number of voting mechanisms for regularly-nominated candidates for such office, the mechanisms of all said parts being normally connected within the unit-frames and capable of intercommunication or interoperation and an interrupting mechanism that divides the same into single and multicandidate groups, substantially as described.

14. The combination, in a voting-machine, of a suitable grouping device and a motor part with a series of voting-machine units identical in construction, and the act of assembling which one upon the other in number equal to the number of offices to be filled at an election completes the whole as a multicandidate group and with said grouping device prepares the machine for use by voters, substantially as described.

15. A voting-machine composed wholly of independent machine office units so constructed that the act of assembling the same interengages the limiting mechanisms thereof, in combination, with the machine base unit, and a grouping device, substantially as described.

16. A voting-machine comprising a series of segregable machine units, each having means representing a definite number of regularly-nominated candidates for one office, and means in all the units interengaged throughout the units controlling or limiting the vote of a single voter, substantially as described.

17. A voting-machine having its frame composed of a base unit and a series of voting unit-frames arranged thereon, interlocking means securing said parts together, said unit-frames containing voting mechanisms, and said base unit having a positively-operating mechanism to control the selective voting operation of the mechanisms of said units, substantially as described.

18. In a voting-machine, the combination of the base-section having a suitable support, with a series of units successively interlocked with one another thereon, each thereof representing an office and having a full complement of voting mechanisms to represent candidates therefor, and grouping and motor means mechanically controlled from said base-section operatively relating said units, substantially as described.

19. In a voting-machine, the combination of the base-section, having a suitable support, with a series of units successively interlocked thereon, each thereof representing an office and having a full complement of voting mechanisms to represent candidates therefor, means controlled from said base-section operatively relating said units, and relatively-movable exterior means for operating the mechanisms of said base-section, substantially as described.

20. In a voting-machine the combination of a series of voting units each comprising a frame and voting and limiting mechanisms, the frames of the units being the frame of the machine and an operating mechanism associated with any required number thereof, which number may be changed without alteration of said operating mechanisms, substantially as described.

21. In a voting-machine, the combination with voting units each comprising a frame and voting and limiting mechanisms, and the frames of which units constitute the frame of the machine, of a positively-actuated operating mechanism therefor, adapted, without alteration, for association and use with any number of said units, according to the requirements of any given election for operating and controlling the operation of said voting and limiting mechanisms, substantially as described.

22. In a voting-machine, a suitable frame and a universal operating mechanism arranged therein, in combination with a series of segregable voting-machine units as defined arranged thereon one upon the other in succession, and operative in connection therewith, and the operation of which is alone controlled from the mechanisms of said base or support, substantially as described.

23. In a voting-machine, the combination with a suitable base unit or support containing operating and controlling devices, of a series of voting-machine single-office units arranged upon said base unit and one upon the other in succession and each comprising a frame and voting and limiting mechanisms, said base unit permitting the employment with it of any number or arrangement of said units required to complete the voting-machine, for any election, and means for grouping said office units, substantially as described.

24. A voting-machine comprising a base or support in combination with a series of independently-operative office units arranged thereon and one upon the other in succession, said base permitting the employment therewith of any number of said units, according to the requirements of an election, and a coupling mechanism adapting the machine to a particular election for single and multi candidate voting, substantially as described.

25. In a voting-machine, the combination of the frame-base part adapted for employment with an auxiliary frame or frames, and voting mechanisms in the latter, with universal operating mechanisms provided in connection with said frame-base part and permitting the employment thereof with any desired number of voting mechanisms, without alteration in said frame-base part, and suitable limiting means provided in connection with said voting mechanisms, substantially as described.

26. The base-frame part of the voting-machine in combination with interchangeable voting devices arranged thereon, and a universal operating mechanism provided in connection with said base-frame part, and permitting the interchange, removal, or increase in the number of said voting devices, said base part being of less size than the body of interchangeable voting devices thereon, substantially as described.

27. In a voting-machine, a suitable base, in combination with a series of unit-frames arranged thereon and one upon the other in succession, forming therewith the frame or body of the voting-machine, each of said unit-frames having a complement of voting mechanisms, and said base having an operating and controlling mechanism for regulating the operation of the mechanism of said unit-frames, and said base being capable of employment with one or more of said unit-frames and the mechanisms to constitute a voting-machine for any given election, substantially as described.

28. The combination with a base-frame part of an auxiliary frame erected on the top thereof, voting, operating and limiting mechanisms for a number of offices arranged in the latter, and provided with grouping means, and means in said base-frame part adapted for controlling the operation of the voting mechanisms in said auxiliary frame or another applied in place thereof to said base-frame but having a greater or less number of voting and other mechanisms whereby said base-frame is adapted for employment in machines to meet the requirements of different elections, substantially as described.

29. A voting-machine having a suitable base-frame provided with controlling and limiting mechanisms and capable of employment with a larger body made up of voting and limiting mechanisms in such number as is required for a given election, which number may be increased indefinitely or diminished with regard to said base-frame in combination with such mechanisms and grouping and locking mechanisms directly associated therewith, substantially as described.

30. In a voting-machine the combination with a suitable base-frame part, of controlling and operating means arranged in connection therewith, and with a suitable grouping mechanism being both capable, without alteration, of operating any number of voting mechanisms required to complete the voting-machine for an election, substantially as described.

31. In a voting-machine, the combination, of a suitable base-frame part with controlling and operating means arranged in connection therewith, both being capable without alteration of employment with any number of voting mechanisms required for an election, and a required number of voting mechanisms which with the base unit combined therewith constitutes the entire machine, substantially as described.

32. A voting-machine, comprising a number of duplicate machine units, one for each office, and resting one upon the other, and each having voting, operating and limiting mechanisms for several candidates, and means for simultaneously and positively operating the selected voting mechanisms of all said units, substantially as described.

33. A voting-machine comprising a number of duplicate machine units, each having two or more candidate-counters and actuators therefor, a base or main section, and means in connection therewith relatively movable to positively operate all said actuators, substantially as described.

34. A voting-machine comprising a number of machine units, one for each office, resting one upon the other, and each equipped with vote-registering mechanisms, interengaging means connecting the mechanisms of units representing similar offices, and means for simultaneously and positively operating the various mechanisms of all of the units before and after the voting operation, substantially as described.

35. A voting-machine composed of a number of duplicate machine units, one for each office, and each carrying a series of individual voting devices and counters, mechanical operating and limiting mechanisms, and also carrying means for the operation thereof and for mechanically controlling the operation thereof, and means for simultaneously actuating the selected counters of said units, substantially as described.

36. A voting-machine comprising a number of duplicate machine units, one for each office, and each provided with two or more individual counters and associated mechanisms, a series of counter-concealing plates, and positively-actuated means operative thereon for simultaneously concealing or exposing the counters of all said units while locking the same, substantially as described.

37. A voting-machine comprising a number of duplicate machine units, one for each office, each comprising a frame and voting and limiting mechanisms and each having two or more counters for the candidates for its office, actuators for said counters, locking devices in each unit-frame, common to the actuators thereof, and means in each unit-frame for simultaneously operating said locking devices, substantially as described.

38. A voting-machine comprising a number of duplicate machine units, each representing an office, and having a series of voting mechanisms including voting-keys, and also including a device engaging and operable upon all the keys of the unit to lock the same, and movable to unlock said keys, and means positively actuated in each unit for operating said devices simultaneously, substantially as described.

39. A voting-machine including and having its body made up of a number of machine units, one for each office, and each having a series of individual counters and associated operating means and positively-operating counter-locking mechanisms, and means common to said units and movable with respect thereto permitting the release of said counters and the return thereof to zero, substantially as described.

40. A voting-machine, comprising a number of machine units suitably connected, one for each office, and each provided with a series of voting mechanisms including counters, means normally concealing said counters, and a suitable booth and means automatically preventing the voting operations upon said mechanisms except when said counters are concealed, substantially as described.

41. A voting-machine including a number of duplicate machine units, one for each office, and each having a series of individual counters and associated actuator mechanisms, means common to said units controlling the operation of the mechanisms thereof, means normally concealing the counters of the units and positively-operated means preventing the operation of the actuator mechanisms when or during the time that the counters are exposed, substantially as described.

42. A voting-machine including a number of duplicate machine units, one for each office, and each having a series of individual counters and associated mechanisms, means common to said units controlling the operation of the mechanisms thereof, means normally concealing the counters of the units, and positively-operated means preventing the operation of the counters when or during the time that they are exposed, and means preventing the exposure of the counters except when the face of the machine as a whole is exposed, substantially as described.

43. A voting-machine including a number of machine units, comprising the body of the machine, one for each office, and each having a series of voting mechanisms, and also having a locking mechanism and an independent locking device common to the units for locking the voting mechanisms thereof, and a device which the voter in entering into and departing from the machine is compelled to operate, said device being connected with both the locking mechanisms of the units and said independent locking device, substantially as described.

44. A voting-machine having its body made up of a number of machine units each complete in itself for recording the votes for candidates for one office, and including a series of counters each having an actuator forming a permanent part of the machine and adapted to be set by a voter, and means for simultaneously operating the selected actuators in all the units to accomplish complete movements of all the selected counters, substantially as described.

45. A voting-machine whereof the rigid structure is formed of a series of segregable machine units resting one upon the other in succession, one for each office, and each comprising a frame and limiting mechanisms and a series of counting devices with individual actuators, and a booth structure applied thereto, and having a relatively-movable part whereon the operation of said counters is dependent, substantially as described.

46. A voting-machine composed of a series of segregable and independently-operable units, each unit having a series of individual-candidate counters, and each unit representing one office and containing a complete complement of limiting mechanisms, and means enabling the use of a unit alone or in a multicandidate group with others, substantially as described.

47. A voting-machine composed of a series of segregable independently-operable units, each having a series of individual-candidate counters, and each unit representing one office, and containing or carrying a complete complement of limiting mechanisms, enabling the use of a unit alone, or in a group with others, and means for operatively connecting or interlocking the limiting mechanisms of units arranged in a group for multicandidate voting, substantially as described.

48. A voting-machine composed of a series of segregable units, each having a row or series of counter devices for one office, and each unit provided with limiting devices, and a transmitting device, and means that interlock or interconnect the limiting devices and transmitting devices of the different units when placed together to complete the voting-machine in either single or multi candidate groups, substantially as described.

49. A voting-machine composed of a series of segregable units, each having a row or series of counter devices for one office, and each unit provided with limiting devices, and a transmitting device, and means that interlock or interconnect the limiting devices and transmitting devices of the different units when placed together to complete the voting-machine, and an interrupter or locking device or mechanisms common to said units, and coöperating with said transmitting devices to prevent the operation of more than a given number of counter devices by one voter, substantially as described.

50. A voting-machine, comprising a series of segregable interchangeable units that include within their frames interconnecting operating parts whereby the voting mechanisms of the different units are operatively related and restricted to a given number of operations by one voter, substantially as described.

51. A voting-machine comprising a series of like segregable units resting one upon or against the other, each comprising a frame, a series of voting mechanisms, operating parts therefor, a limiting mechanism and means for connecting said limiting mechanism with a like limiting mechanism in an adjoining frame, and means whereby said units are adapted for operation singly or in groups, substantially as described.

52. A voting-machine comprising a series of like segregable units, each comprising a series of voting mechanisms, and each also containing a complete limiting mechanism whereby each unit in a body of units is adapted for operation singly or in a group, and means common to the body of units to control the number of operations of their voting mechanisms according to the number of offices to be filled, substantially as described.

53. A voting-machine composed of a number of like segregable units equal in number to the number of offices to be filled, and having counters for each political party, a base section or unit, and means therein operated to permit the operation of the unit mechanisms by a voter at the proper time only and for a given number of candidates only, substantially as described.

54. A voting-machine comprising a series of units, one for each office, each comprising a frame and a full complement of voting mechanisms and limiting means, and each unit also carrying means for operatively connecting its limiting means with the limiting means of the next unit, substantially as described.

55. A voting-machine comprising a series of single-office units, resting one upon the other, each adapted for recording the votes for candidates for the office which it represents, and a single actuating and locking device for all the voting mechanisms of said units, substantially as described.

56. The combination, in a voting-machine, of a series of machine units suitably secured together and as a whole forming the body of the voting-machine, parts upon the faces of said units representing the different political parties, each of said units representing an office and provided with counters for all of the political parties, and a mechanism common to all of the units actuating and locking the voting mechanisms, substantially as described.

57. A voting-machine including a series of units, each having a complete complement of voting mechanisms, and also limiting and restoring means in connection therewith, in combination with mechanisms common to all of the units, limiting the operation of, and for operating and locking various mechanisms thereof, substantially as described.

58. A voting-machine comprising a series of elongated office-unit frames, in combination with transversely-operable voting devices in each frame, longitudinally-operable controlling devices in each frame, and means connecting the latter devices throughout the said frame for common or simultaneous operation and motor means, substantially as described.

59. A voting-machine made of a number of machine units, each comprising an elongated units-frame having a series of transversely-operable voting devices, a longitudinally-operable controlling device, and a motor device in combination with means for operating the motor devices of the several units, substantially as described.

60. A voting-machine made of a number of machine units, each comprising an elongated unit-frame having a series of transversely-operable voting devices, a longitudinally-operable controlling device, and a movable locking device in combination with means for operating the locking devices of the several units, substantially as described.

61. In a voting-machine, comprising a series of units, each having a series of counters, actuators and actuator-key for setting said actuators and also a limiting mechanism, and devices in connection with said keys and actuators for operation with said limiting mechanisms, independent stop mechanism coöperating with said limiting mechanism, and operating means independent of the voting operations of the voter and common to all of the units for operating all of the actuators to move the counters for which actuators are set, substantially as described.

62. The combination, in a voting-machine, of a series of machine units forming the body of the machine, interchangeable parts upon the faces of said units for the names of the candidates and political parties, each of said units representing one office, and having counter devices for each said party, a limiting mechanism for each unit and means coöperating therewith to group said units, and said means being movable when said parts are changed to alter the interconnections of said limiting mechanisms to adapt the machine for a different election, substantially as described.

63. A voting-machine comprising a series of units each having a series of counters, an actuator for each such counter, normally locking the same against operation, but adapted to operate the same and for movement by a voter, means preventing the unlocking of said counter by the voter, and each said unit also including devices for the operation of its actuators and for returning or resetting said actuators for operation by the next voter, and means common to all the units for operating the said devices, substantially as described.

64. A voting-machine composed of interlocked interchangeable, machine units, one for each office having interacting limiting mechanisms, and each unit having a counter for each of a predetermined number of political parties, and means common to said units for locking the same for operation singly or in groups, substantially as described.

65. A voting-machine composed of interlocked interchangeable, machine units, one for each office and having interacting limiting mechanisms, and each having a counter for each of a predetermined number of political parties, and means common to said units for locking the same for operation singly or in groups, said means being movable to alter the relations of the units and adapt the machine for another election, substantially as described.

66. A voting-machine unit comprising a frame completely equipped as a voting-machine for the selection of one of a number of candidates for the same office and capable by mere engagement with a like unit or units of becoming one of a multicandidate group, and a grouping device associated therewith, substantially as described.

67. A voting-machine frame made up of independent unit-frames consisting in the channels or boxes having closed sides, ends and bottom, and having interlocking lugs 3, means being provided to secure the unit-frames together, substantially as described.

68. As a new article of manufacture the voting-machine unit-frame comprising a shallow open box or channel, and having the interlock notches 4 and lugs 3, substantially as described.

69. The voting-machine comprising a series of unit frames or channels to contain voting mechanisms, and provided with interlocking lugs, engaged to prevent lateral or longitudinal movement between said frames, and means for fastening said frames together, substantially as described.

70. In a voting-machine unit-frame comprising a channel having closed ends and an open top, the open top adapted to receive the bottom of a like channel secured thereon, substantially as described.

71. The combination of the open-topped channel provided with the transverse frame-studs 17 in a plane parallel to the top of the channel, with the voting mechanisms members of which are carried upon said studs, and said open top being closed by a like channel, substantially as described.

72. The unit-frame comprising the open-sided box or channel and containing a row or series of voting mechanisms, and limiting mechanisms, and said frame having the limiting-mechanisms slots 68 and 69, and also having a transmitting-pin slot in its bottom, substantially as described.

73. A voting-machine comprising a regulating-mechanism base and a series of machine units, each comprising a frame limiting and operating mechanisms and each containing voting mechanisms for a one-office election, and bolts passing through said frames and also through the said base, fastening the same rigidly together to constitute the machine-body, substantially as described.

74. The combination, of the horizontal base-section and the support or standard whereon the same is arranged, with a number of horizontal interchangeable voting-machine units arranged one above the other on said base-section, and therewith constituting the body of the voting-machine, each of said machine units comprising a frame and voting, limiting and operating mechanisms and adapted to single and multi candidate voting substantially as described.

75. A voting-machine comprising a series of machine units, each containing a series of voting mechanisms, and each containing or provided with an operating locking-gear 8 whereby the voting mechanisms are operated and locked, and means for connecting the gears of all the units when said units are assembled, substantially as described.

76. The voting-machine comprising a number of voting-machine units, each having a series of voting mechanisms that include a key, a rotatable actuator, a counter, and a limiting-device operator, a limiting mechanism for said series of voting mechanisms, a device for returning the keys, and a locking motor device whereby the successive operations of the parts of the voting mechanisms are accomplished, in combination with means common to the units for operating the said devices, substantially as described.

77. The combination, with the unit frame or channel, of the studs 17 arranged transversely thereof, the voting mechanisms having their counting-wheels borne upon said studs, and having counter-operating parts slidably guided by said studs, substantially as described.

78. The combination, with the unit-frame, of the cross-studs that are inserted in openings through one side of the frame, and are fastened in the opposite side of the frame, the counting-wheels journaled upon the ends of said studs and certain of said studs bearing counter-actuators slidable thereon, substantially as described.

79. The combination, with the unit-frame, of the studs 17 of uniform diameter throughout, one side of said frame being provided with openings to admit said studs, and the ends of said studs being fastened in the opposite side of said frame, the limiting mechanism, the separator devices, and the actuators, both the latter being guided upon cross-studs, and the counter-wheels journaled upon said cross-studs, substantially as described.

80. The combination, in a voting-machine, of the unit-frame, with the voting mechanisms arranged therein, and including counter-wheels and rotatable cylindrical counter-actuators, and the studs 17 serving as supports for said wheels and as guides for said actuators, and means for operating said actuators, substantially as described.

81. The combination, in a voting-machine, of the unit-frame, with the voting mechanisms arranged therein, and including counter-wheels and rotatable cylindrical counter-actuators, and the studs 17 serving as supports for said wheels and as guides for said actuators, and means for operating said actuators and actuator-keys also guided upon such studs, substantially as described.

82. The combination, with the unit-frame, of the cross-studs 17 admitted to said frame through openings in one side thereof, and fastened therein, the counter-wheels journaled on the ends of said studs, independent means preventing longitudinal movement of the counter-wheels upon the studs, and said studs also serving as slides or guides for the other parts of the voting mechanisms, substantially as described.

83. In a voting-machine, the combination, with the unit channel or frame, of the counter-wheels, a cross-stud in said frame, and a counter-actuator both slidable and revoluble on said stud for the operation of said counter-wheels, substantially as described.

84. In a voting-machine, the combination, with the unit-frame, substantially as described, of the cross-studs, the voting-key slidable thereon, the actuator revoluble upon said key, the counter for operation by said actuator, and means for rotating said actuator as and for the purpose specified.

85. In a voting-machine, the combination, with the unit-frame, substantially as described, of the cross-studs, the voting-key slidable thereon, the actuator revoluble upon said key, the counter for operation by said actuator, and means for rotating said actuator independently of said key, substantially as described.

86. The combination, with the frame, of the cross-studs, the counter-wheels journaled thereon, and one of said studs devoted to the voting-key, slidable and revoluble thereon, and freely revoluble, and an actuator movable with the key and revoluble with respect thereto for the operation of said counter, substantially as described.

87. In a voting-machine unit, the combination, with the frame, of the counting mechanism, including separators, a series of wedge-blocks operable by said separators and preventing the operation of more than a certain number thereof, stop-blocks engaging said wedge-blocks, a transmitting-bar connected with one of said blocks, said bar and blocks being movable with said wedge-blocks or to return the same, substantially as described.

88. The combination, with two or more machine units, and the voting mechanisms therein, and each having a limiting mechanism, including a stop-block 50, and a transmitting-bar 51, and means in each section to return its block 50 and the transmitting-bar of the next section, substantially as described.

89. A voting-machine comprising a series of interconnected interchangeable machine units, one for each office, and each provided with a limiting mechanism, and a locking-bar movable as each voter enters to and departs from the machine, to respectively unlock and lock the limiting mechanisms of said units separately and individually, substantially as described.

90. The combination in a voting-machine, of a suitable base with a series of machine units thereon and one upon the other, each of said units having its own limiting mechanism, the limiting mechanisms of all the units being interconnected to normally permit the operation of the maximum number of voting mechanisms in each unit, and distinct means coöperating with the limiting mechanisms of the units to limit the number of voting mechanisms that may be operated in each unit by one voter, according to the number and kind of offices to be filled at an election, substantially as described.

91. In a voting-machine, the combination of a suitable base with a series of voting-machine units, each having a full complement of voting mechanisms, and each having its own limiting mechanism, the limiting mechanisms of all said units being connected for interoperation and permitting one voter to register as many votes as there are units representing the different offices and no more, substantially as described.

92. In a voting-machine, the combination of a suitable base with a series of voting-machine units, each having a full complement of voting mechanisms and each having its own limiting mechanism, the limiting mechanisms of all said units being connected for interoperation and permitting one voter to register as many votes as there are units representing the different offices and no more, and means in connection with each unit coöperating with its limiting mechanism to regulate the operation of its limiting mechanism, permitting one vote to be registered in each unit and one only in certain units, while permitting several votes to be registered in any unit comprising a part of a multicandidate group, substantially as described.

93. In a voting-machine, the combination of a suitable base with a series of voting-machine units, each having a full complement of voting mechanisms and each having its own limiting mechanism, the limiting mechanisms of all said units being connected for interoperation and permitting one voter to register as many votes as there are units representing the different offices and no more, and a grouping-bar preventing interoperation between certain of the limiting mechanisms, as and for the purpose specified.

94. In a voting-machine, the combination of a suitable base with a series of voting-machine units, each having a full complement of voting mechanisms and each having its own limiting mechanism, the limiting mechanisms of all said units being connected for interoperation and permitting one voter to register as many votes as there are units representing the different offices and no more, and a grouping-bar preventing interoperation between certain of the limiting mechanisms, said bar being movable to engage said limiting mechanisms in a different arrangement to adapt the machine to different elections, substantially as described.

95. In a voting-machine, the combination of a suitable base or frame, with a series of voting-machine units one upon or against the other, the same being duplicate mechanisms, each including counting devices, operating means, and a limiting mechanism, the limiting mechanisms of all the units engaging one another throughout the units and to adapt the same for coöperation in any required multicandidate group but permitting an independent one-step movement in each unit, and the stop or grouping device limiting the operations of said limiting mechanisms, and hence of the counter devices in the respective units, substantially as described.

96. In a voting mechanism, the combination of a suitable base, or frame, with a series of voting-machine units, the same being duplicate mechanisms each including counting devices, operating means, and a limiting mechanism, the limiting mechanisms of all the units being interconnected to adapt the same for coöperation in any required multicandidate group but permitting an independent one-step movement in each unit, a stop or grouping mechanism limiting the operations of said limiting mechanisms, and hence of the counter devices in the respective units, and a special-class locking-bar movable to engage certain of the limiting mechanisms to positively lock the same against operation, substantially as described.

97. In a voting mechanism, the combination of a suitable base or frame, with a series of voting-machine units, the same being duplicate mechanisms, each including counting devices, operating means, and a limiting mechanism, the limiting mechanisms of all the units being interconnected to adapt the same for coöperation in any required multicandidate group but permitting an independent one-step movement in each unit, a stop or grouping mechanism limiting the operations of said limiting mechanisms, and a general locking-bar movable to engage all of the limiting mechanisms to positively lock the same against operation, substantially as described.

98. In a voting mechanism, the combination of a suitable base or frame, with a series of voting-machine units placed one against the other, the same being duplicate mechanisms each including counting devices, operating means, and a limiting mechanism, the limiting mechanisms of all the units being interengaged one with the other to adapt the same for coöperation in any required multicandidate group but permitting an independent one-step movement in each unit, and a locking device engaging certain of the limiting mechanisms and leaving certain thereof free to permit multicandidate votes in number equal to the number of units in a group of units including free limiting mechanisms, substantially as described.

99. The voting-machine proper comprising a suitable base and a series of independent segregable machine units, one for each office, and each comprising a frame containing a series of counting devices and also containing a longitudinally-extending operating mechanism for said counting devices and including a motor part therefor having a bearing in said frame, in combination with a booth or closure having a relatively movable member for the relative simultaneous operation of all said motor parts with respect to the other mechanisms in their units, substantially as described.

100. The voting-machine proper comprising a suitable base and a series of independent segregable machine units one for each office and each having a series of counting devices and an operating mechanism and also including a motor and locking part for said operating mechanism, and a booth or closure with relation to which said machine is relatively movable for the operation of the motor and locking part in each unit, and the movement of said motor and locking parts being greater than required for the operation of the associated mechanisms in the units, whereby need of accurate adjustment is avoided, substantially as described.

101. A voting-machine comprising a series of like machine units, placed one against the other and the frames of the units constituting the frame of the machine, each one having a series of counting mechanisms and voting devices, and each representing one office, said voting devices adapted for operation by a voter, and an external part relatively movable to accomplish the counting operation after the voting operation of a voter, substantially as described.

102. A voting-machine composed of a suitable base or frame and a series or number of voting-machine units substantially as herein described, each containing a single element or device for operation upon the mechanisms thereof and whereby alone the automatic counting operations of the mechanisms in respective units are accomplished, and positively-actuated means for moving all said elements with relation to their units, substantially as described.

103. In a voting-machine, the combination of a suitable base with a series of segregable voting-machine office units, each having a full complement of voting mechanisms, and each having its own limiting mechanism, the limiting mechanisms of all said units being connected for interoperation and permitting one voter to register as many votes as there are units representing the different offices, and means in every unit operative to return its limiting mechanism, substantially as described.

104. In a voting-machine, the combination of a suitable base with a series of segregable voting-machine units, each having a full complement of voting mechanisms, and each having its own limiting mechanism, the limiting mechanisms of all said units being connected for interoperation and permitting one voter to register as many votes as there are units representing the different offices, and means in every unit operative to lock its limiting mechanism, substantially as described.

105. A voting-machine composed of a suitable base or frame and a number of machine units each comprising a frame and voting and limiting mechanisms, and each frame provided with operating and locking means and also containing a single part by which latter alone the positive and automatic counting and locking operations of the mechanisms in respective units are accomplished, and means for operating said single parts, substantially as described.

106. A voting-machine composed of a suitable base or frame and a number of voting-machine units each comprising a frame and voting, limiting and operating mechanisms and each unit also containing a single element or device for operation upon the mechanisms thereof and whereby the automatic counting and locking operations of said mechanisms in respective units are accomplished, substantially as described.

107. A voting-machine composed of a suitable base or frame and a number of voting-machine units each comprising a frame and voting mechanisms contained therein, said voting mechanisms each having a member that is a permanent part thereof for operation by a voter, one such frame being provided for each office and each having a series of counters, and also provided with a single part or element for operating the counters, and whereby alone the automatic counting operation of said counters is accomplished, substantially as described.

108. A voting-machine comprising a suitable base and a number of machine units arranged thereon, and each representing an office and provided with a number of voting mechanisms each having a member for operation by a voter, each of said units being also provided with limiting and operating means, and said base having mechanisms controlling and for actuating the mechanisms of said units, and manual locks provided in or upon said base for controlling and actuating the mechanisms thereof, substantially as described.

109. A voting-machine comprising a suitable base and a number of machine units, substantially as herein described, each provided with a series of counters and actuators therefor and also having a limiting mechanism for operation by a voter, and positively-actuated means also being provided in each unit to return all parts of its limiting mechanism and justify its actuators thereby, substantially as described.

110. A voting-machine comprising a suitable base and a number of machine units, substantially as herein described, each provided with a series of counters and actuators therefor, an actuator-returning mechanism and also having a limiting mechanism for operation by a voter, means also being provided in each unit to return its limiting mechanism, and the limiting mechanism of each unit adapted when returned to accomplish the final return or justification of the actuators of each unit and lock the same, substantially as described.

111. In a voting-machine, the combination, of a suitable base, with a series of voting-machine units, each having a full complement of voting mechanisms and each having its own limiting mechanism, and a grouping-bar controlling the operation of the limiting mechanisms of all said units, substantially as described.

112. In a voting-machine, the combination, of a suitable base, with a series of voting-machine units, each having a full complement of voting mechanisms and each having its own limiting mechanism, and a grouping-bar controlling the operation of the limiting mechanisms of all said units, said bar being movable to alter the grouping or arrangement of said mechanisms, substantially as described.

113. In a voting-machine, the combination, of a suitable base, with a series of voting-machine units, each having a full complement of voting mechanisms, and each having its own limiting mechanism, and a grouping-bar controlling the operation of the limiting mechanisms of all said units, said bar being movable to alter the grouping or arrangement of said mechanisms, and means provided upon said base whereby the position of said bar is indicated and fixed, substantially as described.

114. A voting-machine composed of a suitable base and a numbr of machine units, substantially as described, interlocked thereon and therewith forming a rigid structure or machine-body, a motor part in each unit for the positive and negative operation of the mechanisms therein, a motor part in said base for the simultaneous operation of said parts in the units, a booth part or closure, said body and said closure being relatively movable and the connection between the same being made in said base and to the operating part therein, substantially as described.

115. A voting-machine comprising a series of tiers or rows of counters, and their associated mechanisms, in combination with an intermittent motor-gear for each tier to positively operate said counters and mechanisms and means for the simultaneous operation of all said gears upon the entrance and departure of a voter to and from the machine, substantially as described.

116. The combination, in a voting-machine, of two or more tiers of voting mechanisms, each such mechanism including a counter-actuator, a series of motor and locking gears, one for each tier, and whereby alone the actuators of respective tiers are operated to register votes, substantially as described.

117. A voting-machine built up of a number of independent separable machine units, each having a frame containing voting mechanisms, and each provided with a motor-gear, substantially as described, for operating said mechanisms, means securing said frames together, and the shaft passing through said frames, and whereby all said gears are operated, substantially as described.

118. A voting-machine composed of a series of segregable structurally-connected independent single-office units equipped with voting mechanisms, and means rendering the mechanisms thereof interoperative by the act of resting one unit upon the other, substantially as described.

119. A voting-machine composed of a series of independently-operative machine units, each comprising a frame and voting and limiting mechanisms and which units being assembled constitute the body of the machine, and the act of placing one upon the other renders the same interoperative, whereby one voter may record as many votes as there are units, and independent means dividing said series of units into single and multi office groups, substantially as described.

120. A voting-machine unit comprising a channel-like frame in combination with voting mechanism provided therein and including actuators and also including a limiting mechanism and a motor-gear, and means interposed between said gear, said actuators and said limiting mechanism whereby upon the movement of said gear said actuators and said mechanism are successively operated, substantially as described.

121. In a voting-machine, the combination, with a series of tiers of voting mechanisms, each having its own limiting mechanism operable by the voting mechanisms thereof, with a grouping-bar itself stationary, but controlling the operation of the limiting mechanisms of all said tiers during the voting period, substantially as described.

122. In a voting-machine, the combination, with a series of tiers of voting mechanisms, each having its own limiting mechanism operable by the voting mechanisms thereof, with a grouping-bar controlling the operation of the limiting mechanisms of all said tiers, said bar being movable and when moved altering the grouping of said tiers to adapt the machine for a different election, substantially as described.

123. In a voting-machine, the combination, with the frame, of the voting mechanisms, including counters and actuators, locking means therefor, means concealing the counters, and common means for operating said concealing means and securing said locking means to lock said actuators against operation upon the counters, substantially as described.

124. A voting-machine having counters and limiting mechanisms, with a bar controlling or limiting the operation of said mechanisms and counters, and movable to alter the arrangement of said mechanisms for different elections, counter-concealing party plates or slides, two or more for each party, and interchangeable according to the position of said bar, substantially as described.

125. The combination, in a voting-machine, of a suitable frame, with counters and counter-keys, with movable plates normally concealing said counters, and movable to expose the same, said plates serving as stops for the voting-keys of the machine, substantially as described.

126. The combination, in a voting-machine, of a suitable frame, with counters, and counter-keys, with movable plates normally concealing said counters, and movable to expose the same, said plates serving as stops for the voting-keys of the machine, and means in connection with said plates for moving the same and locking said keys against operations, substantially as described.

127. The combination, in a voting-machine, of a suitable frame, with counters and counter-keys, with movable plates normally concealing said counters, and movable to expose the same, said plates serving as stops for the voting-keys of the machine, and said plates being further movable to permit the disengagement or unlocking of said counters for the purpose of returning the same to zero, substantially as described.

128. The combination, in a voting-machine, of the voting mechanisms, including counters, with counter-concealing slides, and means preventing the operation of said slides thereof to expose the count except after the complete operation of the counters last preceding such exposure, whereby the record of the last vote is insured, substantially as described.

129. A voting-machine comprising a suitable frame and counters and actuators arranged in office rows therein, limiting mechanisms therefor for operation by a voter and a positively-actuated means to return all parts of said limiting mechanism and by said mechanism justify said actuators, substantially as described.

130. In a voting-machine, the combination, with the series of parallel-axis disk counters all for one political ticket, with means concealing all but one figure on each counter-disk, a slide normally concealing the figures and having openings through which the same may be seen when said slide is moved, and means preventing the movement of said slide except when said counters are locked against operation, substantially as described.

131. In a voting-machine, the combination, with a series of counters representing a political ticket, of a slide whereby said counters are normally concealed, said slide having two sets of openings for each counter, and having two distinct movements, one to expose the counters and prevent further movement thereof, and a second movement to at once expose the count and permit the return of the counters to zero, substantially as described.

132. In a voting-machine, the combination, with a series of counters representing a political ticket, of a slide whereby said counters are normally concealed, said slide having two sets of openings for each counter, and having two distinct movements, one exposing and locking the counters against further vote-recording movements while exposed, and the second at once exposing the count and the operating-arbor of each and permitting the return thereof to zero, substantially as described.

133. In a voting-machine, the combination, with a series of counters, with an actuator for each continuously interlocked therewith, operable in the plane thereof and preventing independent movement of the counter, a counter-concealing device movable to expose the count, and means in combination therewith operating to lock said actuators against operation, substantially as described.

134. In a voting-machine, the combination, with a series of counters, with an actuator interlocked therewith, preventing independent movement of the counter, a counter-concealing device movable to expose the count, and means in combination therewith operating to lock said actuator against operation, and said means capable of further movement permitting the disengagement of the actuators from their counters to allow the return thereof to zero, substantially as described.

135. In a voting-machine, the combination, with a series of counters, with an actuator interlocked therewith, preventing independent movement of the counter, a counter-concealing device movable to expose the count, and means in combination therewith operating to lock said actuator against operation, and said means capable of further movement permitting the disengagement of the actuators from their counters to allow the return thereof to zero while said actuators are held against voting operations upon said counters, substantially as described.

136. In a voting-machine, the combination, with a series of counters, with an actuator for each, interlocked therewith, preventing independent movement of the counter, a counter-concealing device movable to expose the count, means in combination therewith operating to lock said actuators against operation, said device capable of further movement permitting the disengagement of the actuators from their counters to allow the return thereof to zero, and said device preventing voting operations of said counters at any time after the first exposure of the count until the actuators are all again interlocked with their counters, and said counters concealed, substantially as described.

137. The combination, with the continuously-interlocked counter and actuator, the counter-concealing slide movable to expose the count, and means to prevent the operation of the actuator and the counter until the counter is concealed, substantially as described.

138. The combination, with the continuously-interlocked counter and actuator, the counter-concealing slide movable to expose the count, and means to prevent the operation of the actuator or the counter until the counter is concealed, and means for automatically liberating the actuator for operation after the counter is concealed, substantially as described.

139. In a voting-machine, the combination, with a series of counters, each having an actuator, the counter and actuator in each instance being interlocked to prevent movement of the counter through any other medium, a name slide or plate limiting the movement of said actuators and preventing the disengagement thereof from their counters, and said slide being movable to permit the freeing of said actuators, and the free movement of said counters for the purpose specified.

140. A voting-machine comprising a series or number of machine units, each provided with a number of counters and associated mechanisms including an actuator for each counter, said actuators locking their counters against movement by other means, each unit provided with stops limiting the throw of its actuators and preventing the disengagement thereof from their counters, and certain of said stops being movable to permit such disengagement and the independent operation of said counters, substantially as described.

141. A voting-machine comprising a series or number of machine units, each provided with a number of counters and associated mechanisms, including an actuator for each counter, said actuators locking their counters against independent movement, and name-plates extending transversely of said units serving as stops for said actuators and adapted for movement to expose the counters, and adapted for further movement to permit the disengagement of the actuators from their counters and the independent operation of said counters, substantially as described.

142. A voting-machine comprising a series or number of machine units, each provided with a number of counters and associated mechanisms, including an actuator for each counter, said actuators locking their counters against independent movement, and name-plates extending transversely of said units, serving as stops for said actuators, and adapted for movement to expose the counters, and adapted for further movement to permit the disengagement of the actuators from their counters and the independent operation of said counters, and said actuators when disengaged preventing the reinstatement of said plates to conceal the counters, and means preventing the operation of the counters until they are concealed, substantially as described.

143. A voting mechanism comprising a series of counters and actuators therefor each normally interlocked with its counter, said actuators adapted for movement by a voter and adapted to operate their counters, stops limiting the movements of said actuators and adapted to be moved to permit the disengagement of the actuators from their counters, and said counters when thus disengaged being independently operative, substantially as described.

144. A voting-machine comprising a suitable frame and rows of counters and counter-actuators, the latter operable by a voter with suitable limiting-blocks operable by said actuators by the hand of the voter, an actuator-returning mechanism positively actuated and positively-actuated means for returning or restoring said limiting-blocks to further eject or return said actuators, leaving said actuators and limiting-blocks in contact, substantially as described.

145. In a voting-machine, a suitable base in combination with a series of machine units, substantially as herein described, party-slides concealing the counters of said units and movable transversely of said units, said slides extending into said base, and means in said base to lock and to operate said slides, and means also provided in said base compelling the locking of all the unit mechanisms before said slides may be operated to expose the counters of said units, substantially as described.

146. In a voting-machine, a number of structurally-interlocked machine units, each representing an office, and provided with a number of counting mechanisms to record votes, in combination with a base projecting beyond the faces of said units, and counter-concealing slides upon the faces of said units and extending into the projecting part of said base, and means in said base movably securing said slides, substantially as described.

147. In a voting-machine, the combination, of a series of counters, and the actuators therefor adapted for movement by a voter, actuator-operating means, a limiting mechanism and separators operable thereon and movable with said actuators, means permitting the movement of said actuators to disengage the same from their counters, and said separators being always in engagement with said limiting mechanism regardless of the position of their actuators, substantially as described.

148. In a voting-machine, the combination, with the machine-unit frame, of the counters therein, the actuator movable transversely of said frame, and having its inner end suitably supported therein, and the sleeve or bracket projection provided upon said frame and serving as a guide for the outer part of said actuator, and a counter-concealing name-slide held in said bracket, substantially as described.

149. In a voting-machine, the combination, with the machine-unit frame, of the counters therein, the actuator movable by a voter, and having its inner end suitably supported therein, and the sleeve or bracket projection provided upon said frame and serving as a guide for the outer part of said actuator, and a counter-concealing name-slide held in said bracket, substantially as described.

150. The combination, with two or more of the unit-frames, each containing counters for which actuators are provided, and each of said frames provided with bearing-brackets between its counters, and whereby said actuators are guided, and the slidable plates concealing said counters and held between said brackets, substantially as described.

151. In a voting-machine, the combination, with a counter, of a voting-key, an actuator movable by said key, and in turn operable upon said counter, positively-actuated means for thus operating said actuator, said key alone controlling the relation between said actuator and counter for registering votes, and means concealing said actuator and at all times preventing the direct operation thereof by the voter, and independent means concealing said counter, substantially as described.

152. The combination, in a voting-machine, of a counter, means concealing the same but movable to expose the counter, an actuator interlocked with said counter to prevent the independent movement thereof, means for operating the actuator to operate said counter, and a key for operation by a voter to position said actuator for operation upon the counter, substantially as described.

153. A voting-machine including in its structure a series of counting mechanisms representing candidates of the same political party, and a movable name-plate and means for simultaneously moving said name-plate to expose the count and lock the counting mechanisms against operation while exposed, substantially as described.

154. A voting-machine in combination with the booth therefor, the face of said machine being normally exposed, and the voting mechanisms including the counters of the machine being locked when the face is thus exposed, said machine having a series of slides normally concealing the counters, means for moving said slides, and means preventing the movement thereof to expose said counters except when said booth is opened to expose the face of the machine, substantially as described.

155. In a voting-machine, the combination, with two or more tiers of voting mechanisms, including the counters and counter-actuators, with name and party slides normally concealing the counters, said actuators normally locking said counters but operable to move said counters, said plates having notches that may be moved opposite said actuators, and said actuators when the plates are in such positions adapted for disengagement from the counters to permit independent movement thereof, substantially as described.

156. The combination, with the counters, of the actuators, and a party-slide provided with counter-exposing holes 99 and 100, and said plate adapted for two distinct movements, one to expose the count and the other to expose the count and the arbors of said counters, substantially as described.

157. The unit-frame provided with the blocks or brackets having guides 94, the counters, and the counter-concealing plates held in said guides of said brackets, and movable therein to expose the count, substantially as described.

158. The unit-frame provided with bearing blocks or brackets and supporting the counter, the stud or shaft provided in said frame and extending into one of said blocks, the key provided upon said stud and guided in the block, and the actuator movable by said key to position the same for operation upon said counter, means within said frame for operating said actuator, and the counter-concealing slide held between said blocks and movable to expose the count, substantially as described.

159. The unit-frame provided with bearing blocks or brackets and supporting the counter, the stud or shaft provided in said frame and extending into one of said blocks, the key provided upon said stud and guided in the block, and the actuator movable by said key to position the same for operation upon said counter, means within said frame for operating said actuator, the counter-concealing slide held between said blocks and movable to expose the count, the said slide normally serving as a stop for said actuator and movable to permit the disengagement thereof from said counter, for the purpose specified.

160. The combination, in a voting-machine, of a series of counters representing the candidates for the same political office, with a slide 95 provided with openings through which a single row of figures upon each counter is visible, and a name-slide normally concealing the figures of the counters and provided with two sets of openings, said name-plate being movable to cause one set of openings to register with the openings of the plate 95 and lock said counters and said plate being further movable to cause the other set of openings therein to register with the openings in said plate 95, and the first set of openings to register with the arbors of said counters to permit the return of the counters to zero by suitable means, substantially as described.

161. A voting-machine, substantially as herein described, having a name-plate and counter-concealing slides adapted for movement to expose the count and upon the position of which the operation of the counters is dependent, substantially as described.

162. A voting-machine comprising counters and associated mechanisms for several offices and candidates of different political parties, and provided with party-slides adapted for movement to expose the count, a bar 103 common to said slides for moving the same, and one or more stop-locks for said bar, substantially as described.

163. A voting-machine, substantially as herein described, provided with movable party-slides, the bar 103 for operating said slides, the rack thereon, means upon the exterior of the machine for operating said rack, and two or more stop-locks 108 and 109 for said bar, as and for the purpose described.

164. In a voting-machine, two or more tiers of voting mechanisms, one tier for each office, in combination with a limiting device for each tier, a step or space limiting device common to and regulating the operation of said limiting mechanisms, and movable to alter the relations of said limiting devices and adapt the machine for a different election, substantially as described.

165. In a voting-machine, two or more tiers of voting mechanisms, one tier for each office, in combination with a limiting device for each tier, a step or space limiting device common to and regulating the operation of said limiting mechanisms having two or more sets of stops for engagement thereof and movable to alter the relations of the said mechanism by tiers, substantially as described.

166. In a voting-machine, two or more tiers of voting mechanisms, one tier for each office, in combination with a limiting device for each tier, and a device common to the limiting devices of all the tiers controlling the operation thereof, and adapted for movement or alteration bodily to adapt the machine to a different election, substantially as described.

167. In a voting-machine, two or more tiers of voting mechanisms, one tier for each office, in combination with a limiting device to control the operation of the mechanisms thereof, and movable means common to all the limiting mechanism alone controlling the grouping of said tiers for the purpose of multicandidate voting and when moved altering the relations of said tiers, substantially as described.

168. In a voting-machine, the combination of two or more tiers of voting mechanisms, one tier for each office, with a single device stationary during the operation of the machine for permitting the coöperation of any two or more adjoining tiers of mechanisms for multicandidate voting, substantially as described.

169. In a voting-machine, the combination of two or more tiers of voting mechanisms, one for each office, with a system of limiting-wedges for each tier and operative by or with the voting mechanisms thereof, and a single stop device movable to operatively connect the systems of wedges of any two or more adjoining tiers, substantially as described.

170. In a voting-machine, the combination of a series of tiers of voting mechanisms, with a step-by-step movable limiting mechanism for each tier, and a set of stops separated by predermined distances and movable together to lock said limiting mechanisms, as and for the purpose described.

171. In a voting-machine, the combination of a number of tiers of voting devices, one tier for each office, with a movable operation-limiting means for each tier, and stops for limiting the movements of said means, said stops being stationary during the voting period and movable to alter the relations or connections of the limiting means of the different tiers, and means controlling the relative positions of said stops and compelling the proper grouping thereof when the same are moved, substantially as described.

172. A voting-machine comprising a series of tiers of interconnected voting mechanisms, one tier for each office, and each having limiting-blocks and a locking-bar movable as each voter enters and departs from the machine to respectively lock and unlock the limiting-blocks of said tiers and the associated voting mechanisms, substantially as described.

173. In a voting-machine, the combination of a series of tiers of voting mechanisms, and associated mechanisms, each including a limiting device, and a set of relatively stationary stops for said limiting devices, said stops being fixed for simultaneous movement movable to alter the relations of the limiting devices in the different tiers, substantially as described.

174. In a voting-machine, the combination, of two or more tiers or series of voting mechanisms, each series devoted to candidates for a single office, and each having a limiting mechanism, and normally-stationary stops controlling the operation of said limiting mechanisms, and said stops being movable together with respect to said tiers to alter the relations of said limiting mechanisms and their tiers of voting mechanisms, for the purpose specified.

175. In a voting-machine, the combination, of two or more tiers or series of voting mechanisms, each series devoted to candidates for a single office, and each having a limiting mechanism, and normally-stationary stops controlling the operation of said limiting mechanisms, and said stops being movable together with respect to said tiers to alter the relations of said limiting mechanisms and their tiers of voting mechanisms, and means preventing incomplete movements of said stops, for the purpose specified.

176. In a voting-machine, the combination of two or more tiers of voting mechanisms, each provided with a limiting mechanism to regulate the use of its voting mechanisms, a bar adapted for movement to alternately lock and unlock all the parts of said limiting mechanisms, means for operating said bar, and said voting mechanisms being operable only when respective limiting mechanisms are disengaged from said bar, substantially as described.

177. In a voting-machine, the combination of two or more tiers of voting mechanisms, having interoperative parts, and each tier provided with a limiting mechanism to regulate the use of its voting mechanisms with a bar adapted for movement to alternately lock and unlock all parts of said limiting mechanisms, and automatic bar-operating means whereby alone said bar is movable and said voting mechanisms being inoperative except when disengaged from said bar, substantially as described.

178. In a voting-machine, the combination of two or more tiers of voting mechanisms having interoperative parts, and each tier provided with a limiting mechanism to regulate the use of its voting mechanisms with a bar adapted for movement to alternately lock and unlock said limiting mechanisms, automatic bar-operating means whereby alone said bar is movable and said voting mechanisms being inoperative except when disengaged from said bar, and a suitable lock for positively fastening said bar to positively secure the machine and prevent the recording of votes, substantially as described.

179. A voting-machine, having associated counting devices voting-keys and limiting mechanisms, in combination with a special-class locking-bar 74 longitudinally movable and engageable with several of said limiting mechanisms and when engaged therewith preventing the operation of the counting devices related thereto, and said limiting mechanisms being movable by said keys, substantially as described.

180. A voting-machine, having associated counting devices voting-keys and limiting mechanisms, in combination with the special-class interchangeable locking-bar 74, longitudinally movable to lock some of the limiting mechanisms, and means preventing the operation of said bar to lock the limiting mechanisms after a voter has operated one or more keys, substantially as described.

181. In a voting-machine, the combination of a number of tiers of voting mechanisms representing three or more different offices with a limiting mechanism for each tier, an interrupter for said limiting mechanisms, and the limiting mechanisms of all said tiers being engaged one with the other for interoperation, permitting one voter without regard to said interrupter to operate as many voting mechanisms as there are tiers of voting mechanisms, substantially as described.

182. In a voting-machine, the combination of a number of tiers of voting mechanisms for different kinds of offices and each tier having its own limiting mechanisms parallel therewith, and the limiting mechanisms of all said tiers being fastened together one after the other in succession for interoperation and the fastening thereof, permitting one voter to operate as many voting mechanisms as there are tiers, selecting the same from any of said tiers, the extreme ends of the limiting mechanism as a whole being independently secured, substantially as described.

183. In a voting-machine, the combination of a number of tiers of voting mechanisms for different offices, each tier having its own limiting mechanism, the limiting mechanisms of all said tiers being interconnected for interoperation by interlocking parts thereon, and means whereby desired limiting mechanisms may be locked against communication of the movement to adjacent mechanisms, substantially as described.

184. In a voting-machine, the combination, of a number of tiers of voting mechanisms, each tier having its own limiting mechanism, and the limiting mechanisms of all said tiers being interengaged for interoperation, and a single means stationary during the voting period common to all the limiting mechanisms to lock certain thereof, for the purpose specified.

185. In a voting-machine comprising a number of tiers of voting mechanisms, one tier for each office, each tier provided with a limiting mechanism, said limiting mechanisms being interconnected, but each permitted a single independent movement, and means common to said limiting mechanisms controlling the interoperation thereof, and said common means being movable to alter the conditions of its control of said limiting means, substantially as described.

186. In a voting-machine, the combination, of a suitable frame, with a series of tiers of counters and associated mechanisms, each tier having its own limiting mechanism, means interconnecting adjacent limiting mechanisms throughout the tiers, permitting one independent movement of each limiting mechanism without effect upon the next limiting mechanism, and a grouping-bar to engage certain of the limiting mechanisms to prevent coöperation thereof with the other limiting mechanisms, substantially as described.

187. In a voting-machine, the combination, of a suitable frame, with a series of tiers of counters and associated mechanisms, each tier having its own limiting mechanism, means interconnecting adjacent limiting mechanisms throughout the tiers, permitting one independent movement of each limiting mechanism without effect upon the next limiting mechanism, and a grouping-bar to engage certain of the limiting mechanisms to prevent coöperation thereof with the other limiting mechanisms, and said bar being movable into engagement with a different combination of said limiting mechanisms, as and for the purpose specified.

188. A voting-machine comprising a number of tiers of voting mechanisms and associated devices, including a limiting mechanism in each tier, movable with the voting devices thereof, and a notched locking or grouping bar engageable with said limiting mechanisms, and whereby alone said tiers may be divided into single-office and multi-office groups, substantially as described.

189. A voting-machine comprising a number of tiers of voting mechanisms, and associated devices, including a limiting mechanism in each tier, movable with the voting devices thereof, and a notched locking-bar whereby all of said limiting mechanisms may be locked and alone secure all of the voting mechanisms against operation, substantially as described.

190. A voting-machine comprising a number of parallel tiers of counter devices and associated mechanisms, including a limiting mechanism in each tier, said limiting mechanisms comprising rigid parts only and movable by the voter, positive couplings between all the tiers of said limiting mechanisms and movable therewith permitting one-step movement of each independent of the others, substantially as described.

191. A voting-machine comprising a number of parallel tiers of counter devices and associated mechanisms, including a limiting mechanism in each tier and parallel therewith, said limiting mechanisms comprising rigid parts only and movable by the voter, positive connections between all the said tiers of limiting mechanisms and movable therewith permitting one-step movement of each independent of the others, and a grouping-bar engageable with certain of said mechanisms, and dividing said tiers into single-office and multi-office groups as required for an election, substantially as described.

192. In a voting-machine, the combination, of two or more tiers of voting mechanisms, with a limiting mechanism for each tier, said limiting mechanisms being parallel, one-step fastenings between said limiting mechanisms and movable therewith with relation to the frame of the machine whereby each limiting mechanism as a whole is permitted a single movement independent of the others, while further movement of such limiting mechanism will be communicated to the other or others, substantially as described.

193. In a voting-machine, the combination of two or more tiers or rows of voting mechanisms, each for one office, with a rigid limiting mechanism parallel with each tier, one-step pin-and-slot connections between said limiting mechanisms adapting the same for interoperation or coöperation in a multicandidate group, but permitting the operating of one voting mechanism in each tier without affecting the limiting mechanisms of the others, substantially as described.

194. In a voting-machine, the combination, of two or more tiers of voting mechanisms, with a limiting mechanism for each tier operable with the voting mechanisms thereof, a stop-block for each limiting mechanism, and a grouping-bar engageable with certain of said blocks through means permitting single independent movement only of their limiting mechanisms, substantially as described.

195. In a voting-machine, the combination, of two or more tiers of voting devices, with a limiting mechanism for each tier and operable by the devices thereof, means connecting the limiting devices of the different tiers, and including a transmitting stop-block in each said limiting mechanism, and means engageable with certain of said limiting mechanisms permitting single-step movements only of their blocks, preventing the communication of movement therefrom to the limiting mechanism of each, substantially as described.

196. In a voting-machine, the combination, of two or more tiers of voting devices, with a limiting mechanism for each tier operable by the devices thereof, a transmitting-block for each said mechanism, a tier-locking means and a one-step coupling or transmitting connection between each limiting mechanism and the transmitting-block of the succeeding limiting mechanism, said coupling or transmitting mechanism being engageable with said grouping means, substantially as described.

197. In a voting-machine, the combination, of two or more tiers of voting devices, with a limiting mechanism for each tier operable by the devices thereof, a transmitting-block for each said mechanism, a tier-locking means, and a one-step coupling or transmitting connection between each limiting mechanism and the transmitting-block of the succeeding limiting mechanism, said coupling or transmitting mechanism being engageable with said grouping means, and said grouping means being common to all said tiers and movable to different positions to engage different combinations or arrangements of said coupling mechanisms, substantially as described.

198. In a voting-machine, the combination, of two or more tiers of voting devices, with a limiting mechanism for each, a transmitting-block for each limiting mechanism, a transmitting or coupling bar for each tier extending from one end of the limiting mechanism thereof to the opposite end of the limiting mechanism of an adjoining tier and operatively connecting the limiting mechanism thereof with that of the next tier, and means to limit the movement of said transmitting-bars, substantially as described.

199. In a voting-machine, the combination, of two or more tiers of voting devices, with a limiting mechanism for each tier, capable of a step-by-step operation by the devices thereof, a transmitting or coupling bar for each limiting mechanism and in each case extending from the end thereof to the opposite end of the adjoining limiting mechanism and connected therewith and permitting an independent one-step movement between said limiting mechanism, and means common to said tiers to engage certain of said bars, substantially as described.

200. In a voting-machine, the combination, of a suitable base, with a series of voting-machine units, each having a full complement of voting mechanisms, and each having its own limiting mechanism, said limiting mechanism in each case comprising devices for operation with the voting mechanisms, and a coupling and transmitting bar extending from the end of the limiting mechanism to the relatively opposite end of the limiting mechanism of the next unit and having a one-step coupling with the limiting mechanism of the next unit, and a grouping-bar controlling the operation of said bars, substantially as described.

201. In a voting-machine, the combination, with the tiers of counting devices provided therein, said devices including separators, a series of wedge-blocks for each tier and operable by the separators thereof, stop-blocks for each series of wedge-blocks, a transmitting-bar for each series of wedge-blocks connected with one of the stop-blocks thereof, the other stop-blocks in each case being connected with the transmitting-bar of the next tier, and said transmitting-bar and said blocks being movable with said wedge-blocks, returning means, and means securing certain of said transmitting-bars, substantially as described.

202. A voting-machine comprising two or more rows of counters and counter-actuators, limiting means parallel to and so movable with respect to each row, and other means also parallel therewith operatively coupling opposite ends of the limiting means of adjoining tiers throughout the rows for multicandidate voting, substantially as described.

203. A voting-machine comprising two or more tiers of counters and counter-actuators, limiting means parallel with each tier, and other means also parallel therewith operatively coupling opposite ends of the limiting means of two or more tiers in succession for multicandidate voting, and stationary means provided in connection with said limiting means to prevent the operation of more than a certain number of actuators in the tiers that are coupled, substantially as described.

204. In a voting-machine, the combination of series of tiers of counter devices, with a limiting mechanism in connection with each tier, a transmitting-bar also in connection with each tier and its limiting mechanism, and means connecting the bars and limiting mechanisms of adjacent tiers, and means engaging certain of said bars to prevent the operation of more than a given number of counting devices in all said tiers, substantially as described.

205. In a voting-machine, the combination, with a series of tiers, of counter devices, with an auxiliary limiting mechanism in connection with each tier, a transmitting-bar also in connection with each tier and its auxiliary mechanism, and means connecting the bars and auxiliary mechanisms of adjacent tiers, and means engaging certain of said bars to prevent the operation of more than a given number of counting devices in all said tiers, the means engaging said bars being adjustable to alter the interrelation of said tiers, and means preventing the adjustment of said means during the voting period, substantially as described.

206. In a voting-machine, two or more tiers of voting devices each tier having a limiting mechanism, including a stop-block 50 and a transmitting-bar 51, engageable with intermediate operating parts of said mechanism, and means in each tier to return or reinstate its block 50 and the transmitting-bar of the next tier, substantially as described.

207. The combination, in a voting-machine, of two or more tiers of voting mechanisms, one for each office, and each provided with a limiting mechanism controlling the use of said voting mechanisms, and which includes stop-blocks 49 and 50 operable with intermediate devices which complete said mechanism, and a transmitting-bar 51 attached to said block 49, the bars and blocks 50 of adjoining tiers being connected, but permitted a given relative movement, substantially as described.

208. The combination, in a voting-machine, of two or more tiers of voting mechanisms, one for each office, and each provided with a limiting mechanism controlling the use of said voting mechanisms, and which includes stop-blocks 49 and 50 operable with intermediate devices which complete said mechanism, and a transmitting-bar 51 attached to said block 49, the bars and blocks 50 of adjoining tiers being connected, but permitted a given relative movement, a locking-bar engaged with some of said transmitting-bars, and another locking-bar engageable with said blocks 50, substantially as described.

209. In a voting-machine, the combination with a series of machine units each provided with a number of voting devices and a limiting mechanism, a vertical bar extending transversely of said units and common thereto to engage certain of said limiting mechanisms for the purpose specified, and guides in connection with each unit together forming a guide for said bar, said vertical bar being stationary throughout the voting period, substantially as described.

210. In a voting-machine, the combination with a series of machine units each provided with a number of voting devices and a limiting mechanism, a vertical bar fixed during the voting period and extending transversely of said units and common thereto to engage certain of said limiting mechanisms for the purpose specified, guides in connection with each unit together forming a guide for said bar, and means for concealing said bar, substantially as described.

211. A voting-machine comprising a number of segregable machine units each comprising a frame having mechanisms to represent candidates for a single office, and units having interoperative limiting mechanisms, and means for locking out certain of the limiting mechanisms thereof by units or offices, the unit-frames being placed one upon the other with their limiting mechanisms in engagement for interoperation, substantially as described.

212. A voting-machine comprising a series of tiers of voting mechanisms, each tier being provided with a limiting and locking device, in combination with a set locking-bar having parts engaged with certain of said limiting mechanisms, and provided with other parts to engage a different combination or arrangement of said limiting mechanisms with relation to one another, and with certain different arrangements only, and said bar being movable and permitting predetermined arrangements of said limiting mechanisms only, substantially as described.

213. A voting-machine comprising three or more tiers of voting devices having separators or actuators operable by a voter, a limiting mechanism for each tier comprising blocks for movement by the said separators, said blocks being arranged in series parallel with said tiers and being movable in either direction, and the blocks of each tier being connected at opposite ends of said tiers to those of the other for normal coöperation therewith, and means limiting the movement of said blocks in either direction, substantially as described.

214. A voting-machine comprising two or more tiers of voting devices having separators or actuators operable by a voter, a limiting mechanism for each tier comprising blocks for movements by the said separators, the frame or guides for said limiting mechanisms, said blocks being movable in either direction, and the blocks of one tier being connected to those of the other for normal coöperation therewith, and a single device limiting the movements of said blocks in either direction, substantially as described.

215. In a voting-machine, the combination, of two or more machine units, each having a series of counters, actuators and separators, and each provided with a system of wedge-blocks for certain operation by said separators, stop-blocks in each unit for its wedge-blocks, and each unit having a transmitting-bar movable in either direction with said wedge-block and coupling the same with the block at the opposite end of the series of wedge-blocks in the next unit, and means engageable with said bars to prevent movements of certain others in either direction, as and for the purpose specified.

216. In a voting-machine, the combination, of two or more machine units, each having a series of counters, actuators and separators, and each provided with a system of wedge-blocks for certain operation by said separators, stop-blocks in each unit for its wedge-blocks, and each unit having a transmitting-bar movable in either direction with said wedge-block and coupling the same with the block at the opposite end of the series of wedge-blocks in the next unit, and means engageable with said bars to prevent movements of certain others in either direction, the blocks and bars of said units being connected by the act of assembling said units, substantially as described.

217. In a voting-machine, the combination, with a series of counters and counter-operating means, including separators, the limiting wedge-blocks limiting the number of separators that may be operated, and said separators when set acting by frictional engagement alone to hold the counter-operating means in position for operating the counters, substantially as described.

218. The combination, in a voting-machine, of the tiers of counters and counter-keys, with separators movable with said keys, limiting-blocks engaged and movable by said separators, and movable stop-blocks of each tier engaging the first-mentioned blocks, and adjustable stop means limiting the movement thereof and the communication of movement from one tier of limiting-blocks to the other, substantially as described.

219. In a limiting mechanism for a voting-machine, the combination, of the frame, with counter devices, a series of wedge-blocks for movement with voting devices, and transversely and longitudinally movable in said frame, and stop-blocks therefor, longitudinally movable only in said frame, and means for moving said wedge-blocks and limiting the movement of said stop-blocks, substantially as described.

220. In a limiting mechanism for a voting-machine, the combination, of the frame and counter devices for one office, separators associated with said devices for operation by a voter, a series of wedge-blocks between which said wedges are normally held, means closing and holding said blocks together to prevent the operation of said separators, and the counter devices for one office, means for releasing the wedge-blocks, said blocks being transversely and longitudinally movable in said frame, said separators movable therewith, and stops for said wedge-blocks, as and for the purpose specified.

221. In a limiting mechanism for a voting-machine, the combination, of the frame and counter devices for one office, separators associated with said devices for operation by a voter, a series of wedge-blocks between which said separators are normally held, means for holding said blocks together to prevent the operation of said separators, and the counter devices for one office, means for releasing the wedge-blocks, said blocks being transversely and longitudinally movable in said frame, said separators movable therewith, and stops for said wedge-blocks, said stops being longitudinally movable only in said frame, and means for limiting the movement of said stops, substantially as set forth.

222. The combination, in a voting-machine, of the counters and the operating means, with the separators, the movable wedge-blocks, said separators adapted for deflection or movement longitudinally with said blocks and means for preserving the separators and blocks always in the same engagement, and said blocks being beveled to admit the separators regardless of the degree of the movement of said blocks, substantially as described.

223. The combination, in a voting-machine, of the counters, the voting-keys with separators operable thereby, the limiting-blocks, a suitable frame for such parts, and said blocks and separators being movable both longitudinally and transversely with respect to said frame to maintain the same relations between the separators and blocks during and after the operation of some of said separators, as described.

224. The combination, with the counter, of the counter-actuator, movable back and forth, the actuator-key, the separator movable with said actuator, wedge-blocks engaged by said separator, and differential means permitting the independent movement of said wedge-blocks without disengagement from said separator, whereby the same are relied upon to hold the actuator in place, substantially as described.

225. The combination, with the counter, of the actuator interlocked therewith, said actuator being longitudinally movable to position the same for operation upon the counter, means for rotating the actuator to operate the counter and means for afterward returning the actuator, the limiting wedge-blocks, the separator-pin in engagement therewith, said actuator adapted to be withdrawn from engagement with the counter to permit the turning back of the counter, and said wedge-blocks being constructed to still engage the separator-pin between the same when the actuator is withdrawn, substantially as described.

226. The combination, with a suitable frame, with a series of counters, and key-operated actuators movable independently of the keys to operate their counters, separators having link connections with said actuators to be operated by the voting movement thereof, the wedge-blocks wherewith said separators engage and having straight surfaces between which the separators are adapted to enter, links for holding said blocks, whereby as said blocks are moved the separator-links are drawn back to insure the position of the actuators, substantially as described.

227. In a voting-machine, the combination, with a series of counters and actuators, of a series of wedge-blocks, separators operable with said actuators, and links pivotally holding said blocks, substantially as described.

228. In a voting-machine, the combination, with a series of counters and actuators, of a series of wedge-blocks, separators operable with said actuators, and links pivotally holding said blocks, said links being of substantially the length of said separators or wedges, substantially as described.

229. In a voting-machine, the combination, with a series of counters and actuators, of a series of wedge-blocks, separators operable with said actuators, and links pivotally holding said blocks, said links being of substantially the length of said separators or wedges, said wedge-blocks having perpendicular faces, and said separators having lugs to enter between the same and bound therein by the longitudinal movement of the wedges, as and for the purpose specified.

230. In a voting-machine, the combination, with a suitable frame, of a series of counters, a voting-key for each, a series of wedge-blocks, a separator movable with each key and connected therewith by a link, and links of the same length whereby said wedge-blocks are held, as and for the purpose specified.

231. The combination, with a suitable frame, of counters, voting-keys, means for actuating the counters, a separator-link movable with each key, a series of wedge-blocks in engagement with the separator, differential attachments for said wedge-blocks, and means limiting the movement of said blocks, and thereby the number of keys which may be operated by a voter, substantially as described.

232. The combination, with a suitable frame, of a series of counters, voting-keys therefor, adapted to be reciprocated by a voter, independent means controlled by said keys for operating said counters, separators attached to said keys, the wedge-blocks, means to return said keys, means to return the wedge-blocks, and said wedge-blocks operating upon said separators to accomplish the final return movement of said keys, substantially as described.

233. The combination, in a voting-machine, of a suitable frame, with a series of counters and voting-keys, of a series of wedge-blocks, a series of separators adapted for operation by said keys to separate said wedge-blocks, means limiting the movement of the wedge-blocks, positively-actuated means for returning the means limiting the movement of the wedge-blocks, and means to engage and return said keys, said separators being returnable with said keys, substantially as described.

234. The combination, with two or more counters, of an actuator and a separator for each, the separator in each case having a link relation with the actuator, the limiting wedge-blocks engaged by said separator, and links holding said wedge-blocks and maintaining the relations thereof with said separators, substantially as described.

235. In a voting-machine, the combination, with a suitable frame, of a series of counting mechanisms, an actuator for each movable in one way by a voter, a series of wedge-blocks, pivoted links whereby said blocks are held, and wedge-block separators adapted to be operated with respective actuators, and means for accomplishing the independent operation of the actuators that have their separators entered between said blocks, substantially as described.

236. The combination, with a suitable frame, with the counters, the actuators, the separators, the wedge-blocks, means limiting the movement of said blocks, said actuators and separators being movable together in either of two directions by a voter, independent means for operating said actuators, and means preventing the withdrawal or retraction of either the actuators or separators after said actuators are independently moved, substantially as described.

237. The combination, with a suitable frame, with the counters, the actuators, the separators, the wedge-blocks for separation by said separators when operated by a voter, and said blocks tending to hold the separator entered between them and thus hold the associated actuator in its operating position, means limiting the movement of said blocks by said separators, said actuators and separators being movable together in either of two directions, by a voter, independent means for operating said actuators, and means preventing the withdrawal or retraction of either the actuators or separators after said actuators are independently moved, substantially as described.

238. The combination, with the frame, of the counter, with the actuator, the key and the shifter movable upon parallel guides, the fork or yoke upon said shifter engaging said key to move therewith, the transversely-movable separator pivotally attached to said shifter, and the longitudinally-movable and transversely-self-adjusting wedge-blocks, substantially as described.

239. The combination, with a suitable counter, a counter-key, a shifter movable by said key transversely of the frame with said key, the longitudinally-movable wedge-blocks, links whereby the same are held to move parallel with said frame and the separator having a pivotal link attachment to said shifter and movable transversely therewith, and both longitudinally and transversely with said blocks, said separator being in constant engagement with said blocks at all times, and adapted to be entered between the same to separate the blocks, substantially as described.

240. The combination, with a suitable frame, of the counters and voting-keys, with the separator movable with said keys, the suitable guided sliding wedge-blocks engaged with the separators, said separators adapted to enter between said blocks and having parts lapping upon said blocks to hold the same in place upon said frame, substantially as described.

241. A limiting mechanism for a voting-machine comprising a longitudinally-movable series of wedge-blocks, and one or more transversely-movable key-operated separators to enter between said blocks, said separators having a limit of one transverse movement while said blocks are adapted to several steps or movements both transversely and longitudinally and said separators and blocks being adapted to retain the same relations of engagement regardless of the degree of motion of said blocks whereby the degree of possible transverse movement in the separators is made constant, substantially as described.

242. A limiting mechanism for a voting-machine comprising a longitudinally-movable series of wedge-blocks, and one or more transversely-movable key-operated separators to enter between said blocks, said separators having a limit of one transverse movement while said blocks are adapted to several steps or movements both transversely and longitudinally and said separators and blocks being adapted to retain the same relations of engagement regardless of the degree of motion of said blocks, whereby the degree of possible transverse movement in the separators is made constant, and longitudinally-movable means for limiting the movement of said wedge-blocks and not effected by other movement thereof, substantially as described.

243. In a voting-machine, the combination, of two or more machine units, each provided with a series of counting devices, the operations of which are controlled by respective limiting mechanisms including stop-blocks in the lower parts of said units and transmitting-bars in the upper parts thereof, said blocks and bars of the different units having a slot-and-pin connection permitting a one-step independent movement in either of said units and communicating any further movement from one to the other, substantially as described.

244. In a voting-machine, the combination with a suitable frame, of a series of counters arranged in said frame, and each provided with a transversely-movable actuator for movement by a voter, a longitudinally-moving device in said frame for the simultaneous operation of said actuators, a longitudinally-movable limiting device provided in said frame and movable when an actuator is moved by a voter, and means for returning both the longitudinally-movable devices, substantially as described.

245. In a voting-machine, a suitable frame in combination with a series of counters and counter-actuators, the latter transversely operable in said frame, limiting means comprising a series of wedge-blocks and an actuator-operating bar parallel with said means and said means and bar being longitudinally movable in said frame, substantially as described.

246. In a voting-machine, a suitable frame in combination with a series of counters and counter-actuators, the latter transversely operable in said frame, limiting means, actuator-operating means parallel with said limiting means both thereof being movable in their parallel relations longitudinally in said frame, and a longitudinally and transversely movable actuator-returning device also provided in said frame, substantially as described.

247. In a voting-machine, a suitable frame in combination with a series of counters and counter-actuators, the latter transversely operable in said frame, limiting means and actuator-operating means parallel with said limiting means both thereof being movable in their parallel relations longitudinally in said frame, and a longitudinally and transversely movable actuator-returning device also provided in said frame, and means at one point in said frame for operating all of the longitudinally-movable parts, substantially as described.

248. In a voting-machine, a suitable frame in combination with a series of suitable counters and counter-actuators, the latter transversely operable in said frame, parallel limiting means and actuator-operating means, parallel with said limiting means both thereof being longitudinally movable in said frame, a longitudinally and transversely movable actuator-returning device also provided in said frame, and means at one point in said frame for successively operating and locking all of the longitudinally-movable parts, substantially as described.

249. The combination, in a voting-machine, of the counter, counter-actuator and limiting-blocks, with the separator operable in two directions, said actuator and separator forming permanent parts of the machine and being movable independently of each other in both directions for the purpose of completely operating said limiting-blocks and counter successively, substantially as described.

250. A voting-machine comprising a counter, in combination with a rotary actuator continuously interlocked therewith either in its operative or inoperative condition and preventing the movement of the counter by other means, said actuator being movable by the voter but adapted to operate the counter only when moved independently of the voter's movement, substantially as described.

251. A voting-machine having a stationary counter for each candidate and a key for each candidate, each key being operable in both directions without operating the counter, and an independently-movable means dependent upon each key, and adapted by one movement for operating its counter one number, and a positively-actuated mechanism for moving and returning said means with relation to its counter and key, substantially as described.

252. A voting-machine having a counter for each candidate and a key for each candidate, said keys being adapted for reciprocation by a voter, an actuator movable with each key and adapted to be positioned for operation upon the associated counter by the movement of said key, and means for independently operating said actuators simultaneously whether the same have been operated by their keys or not, substantially as described.

253. The combination, with the stationary counter, of a movable key and an independent and movable counter-actuator means controlled but not operated by said key, positively-actuated means for operating said actuator to move the counter one number and afterward to return the actuator, said means for operating the actuator being stationary during the time that the key is operative by a voter, substantially as described.

254. The combination, with the counter, of a key and independent rotary counter-operating means controlled but not operated by said key, means for operating said actuator to move the counter, and afterward to return the actuator, said means for operating the actuator being stationary during the time that the key is operative by a voter and serving as a guide for said actuator when the latter is movable in either direction by said key, substantially as described.

255. A counter-wheel in combination with an actuator capable of longitudinal movement with respect thereto, and in one of its positions adapted for operation upon the counter, and said actuator being also capable of one rotary movement to operate the counter to the extent of one step or number only for each time that said actuator is moved into operative position, substantially as described.

256. A counter-wheel in combination with an actuator capable of longitudinal movement with respect to the axis of said wheel, and in one of its positions adapted for operation upon the counter, and said actuator being also capable of oscillatory operation to operate the counter, and means not individually controlled by the voter for automatically oscillating said actuator, substantially as described.

257. In a voting-machine, a voting key or indicator in combination with a rotary counter-actuator and a counter all relatively movable, said key adapted to move said actuator into position to operate upon said counter, said actuator adapted to move independently of said key to operate said counter, and means to move said actuator without moving said key, substantially as described.

258. In a voting-machine, a voting key or indicator in combination with a counter-actuator and a counter all relatively movable, said key adapted to move said actuator in both directions and hence into position to operate upon said counter, said actuator adapted to move independently of said key to operate said counter, and means to move said actuator without moving said key, and said actuator being free up to the moment of its independent operation to be withdrawn by said key and not thereafter retractile, substantially as described.

259. The combination with a counter of the oscillating counter-actuator incapable of complete rotation, said counter and said actuator as to their axes being relatively movable longitudinally, to position the same for the operation of the counter, and means for operating said actuator, substantially as described.

260. In a voting-machine, the combination, of the counters, with a rotary actuator adapted to be reciprocated by a voter, said actuator always locking said counter, and means for rotating the actuator after its reciprocatory movement by a voter to advance the counter one number, substantially as described.

261. In a voting-machine, the combination, of the counter, the parts of which are normally locked, with a key-operated actuator movable longitudinally with respect to the axes of the counter-wheels whereby alone said counter is operable, said actuator adapted to be reciprocated positively by and with said key in both directions, and always interlocked with said counter to prevent the operation of the counter by the voter, and independent means for operating the said actuator to advance the counter one step, substantially as described.

262. The combination, in a voting-machine, of the counter, with an actuator having both longitudinal and rotary movement with respect to the axes of the counter-wheels, a key for operating the actuator, and also capable of rotation and reciprocation, independent mechanism for oscillating or rotating said actuator, and whereby said counter is operated after the actuator has been set by a voter's operation of said key, and a limiting device operated by said key, substantially as described.

263. The combination, in a voting-machine, of the counter, with an actuator having both longitudinal and rotary movement with respect to the axes of the counter-wheels, a key for operating the actuator, and also capable of rotation and reciprocation, independent mechanism for oscillating or rotating said actuator, and whereby said counter is operated after the actuator has been set by a voter's operation of said key, and a limiting device operated by said key, and said key actuator and limiting device adapted for retraction by a voter during the voting operation, substantially as described.

264. The combination, in a voting-machine, of the counter, with an actuator having both longitudinal and rotary movement, a key for operating the actuator, and also capable of rotation and reciprocation, independent mechanism for oscillating or rotating said actuator, and whereby said counter is operated after the actuator has been set by a voter's operation of said key, and a limiting device operated by said key, and said key actuator and limiting device adapted for retraction by a voter during the voting operation, and means preventing the retraction of said parts after the beginning of the counting operation, substantially as described.

265. A voting-machine counter, comprising interlocked wheels, an actuator having an interlocking surface and interlocked continually with the unit-counter wheel and having a constant degree of engagement therewith, said actuator having an oscillating movement and provided with a tooth or lug to operate the unit-wheel of the counter, substantially as described.

266. A voting-machine counter, comprising interlocked wheels, an actuator interlocked continually with the unit-counter wheel, said actuator having an oscillating movement and provided with a tooth or lug to operate the unit-wheel of the counter, and means for successively placing said tooth or lug opposite said unit-wheel, oscillating said actuator in one direction to operate said wheel and carry such tooth out of engagement therewith and accomplish the return oscillation of said actuator, substantially as described.

267. In a voting-machine, the combination, with a rotary counter, of an actuator comprising an oscillating part having a tooth or arm engageable with the counter when said actuator is moved longitudinally, and means for oscillating the actuator to operate the counter one step only after a longitudinal movement of the actuator, substantially as described.

268. In a voting-machine, the combination, with a rotary counter, of an actuator comprising an oscillating part having a tooth or arm engageable with the counter when said actuator is moved longitudinally, and means for oscillating the actuator to operate the counter one step only, and said actuator being capable of an oscillatory movement proportionally greater than the one-step movement of the counter, and having a locking part or parts to prevent more than a given movement of the counter, substantially as described.

269. In a voting-machine, the combination with a Geneva-movement counter, of a Geneva-movement actuator, having in addition to an oscillatory movement a reciprocating movement, the latter by a voter, and means concealing said counter, and means for operating the actuator to move the counter after the operation of the actuator by a voter, means limiting the movement of the actuator, and means preventing the operation of the counter by the actuator except when said counter is concealed, substantially as described.

270. The combination, of the counter, with a longitudinally-movable actuator revoluble to operate said counter, and normally interlocked therewith, means normally preventing the disengagement of the counter and actuator, but when moved permitting an abnormal movement of the actuator to disengage the same from the counter, and permit the independent movement thereof, substantially as described.

271. In a voting-machine, the combination, with a row of counters, of a limiting mechanism parallel therewith, said counters having rotating actuators operable transversely to said row, and means movable parallel to said row for operating and returning said actuators and said limiting mechanisms, substantially as described.

272. In a voting-machine, the combination, with the counter, of the reciprocating and rotating actuator therefor, means for positively and simultaneously operating and returning said actuator, substantially as described.

273. Counter-wheels in combination with an actuator capable of both longitudinal and oscillatory operation and in one of its longitudinal positions adapted for oscillatory operation to actuate said counter one step only, said actuator adapted to be moved longitudinally in both directions by a voter, and means to prevent the retraction or return thereof after the beginning of the oscillatory movement of the actuator to operate the counter and until the completion of said one step, substantially as described.

274. The combination, with a counter, of an actuator adapted to be positioned by a voter and capable of oscillating movement, a rack constantly engaged therewith for oscillating the actuator and forming a guide therefor, and to prevent the oscillation of the actuator by a voter, and means for moving said rack substantially as described.

275. The combination, in a voting-machine, of the counter, with an actuator having both longitudinal and rotary movement, a key for operating the actuator, and also capable of rotation and reciprocation, an independent mechanism for rotating said actuator for operating said counter after the actuator has been set by a voter's operation of said key, substantially as described.

276. The combination, with a series of counters, of the reciprocating keys, an independently-revoluble counter-actuator for each key, a separator for each key, the wedge-blocks to be moved by the separators, and means that connect the separators and keys permitting free rotation of the latter, substantially as described.

277. The combination, in a voting-machine, of a suitable counter, with a suitable actuator, which the voter may set or place for operation upon the counter, but may not operate to move the counter, said actuator having two movements independent of the voter's movements thereof, one to operate the counter and the other to return the actuator, and positively-actuated means for returning the actuator, substantially as described.

278. The combination, with a suitable counter, with an actuator adapted to be moved by a voter to condition the same for operation upon the counter, means preventing the operation of the counter by the voter and adapted for movement to impart an oscillatory movement to said counter-actuator in two directions, both independent of the voting movement, one to operate the counter and the other to return the actuator, substantially as described.

279. The combination, with a suitable counter, with an actuator adapted to be moved by a voter to condition the same for operation upon the counter, means preventing the operation of the counter by the voter and adapted for movement to impart an oscillatory movement to said counter-actuator in two directions, both independent of the voting movement, one to operate the counter and the other to return the actuator, and independently-operated means to return the actuator longitudinally, substantially as described.

280. A suitable counter, in combination with an actuator capable of reciprocation, and also of oscillation, said actuator as a whole adapted to be reciprocated in both directions by a voter, but incapable of oscillation by a voter, and independent means for oscillating the actuator, substantially as described.

281. A voting-machine comprising a suitable counter, a reciprocating key and a rotating actuator, the latter adapted to be set by said key, and means independent of said key for rotating the actuator, substantially as described.

282. A voting-machine comprising a suitable counter, in combination with the key, an actuator adapted to be moved by said key to set the actuator for independent operation, and means for independently oscillating said actuator to perform the counting operation, and other independent means for returning the actuator after being operated, substantially as described.

283. The combination, with a counter, with a reciprocating and oscillating counter-actuator constantly interlocked with the counter but operable upon said counter, in one position only of the actuator, substantially as described.

284. A voting-machine comprising a suitable counter, in combination with, the reciprocating key, an actuator interlocked with said counter, but adapted to be moved longitudinally with respect to the axis of the counter-wheel by said key by the hand of the voter and while interlocked with the counter, and independent means for operating the actuator, to move the counter, substantially as described.

285. The combination, in a voting-machine, of a suitable counter, with an actuator interlocked therewith, but capable of independent reciprocation, and also capable of independent oscillation without operating the counter, said actuator adapted to be reciprocated to set the same for operation upon said counter, and independent means to oscillate the actuator, as described.

286. A voting-machine comprising a suitable counter, in combination with a reciprocating key for operation by a voter, and a revoluble actuator to be set by said key, and means for operating said actuator in either position of said key whereby said actuator may operate its counter or be justified only, substantially as described.

287. A counter and an actuator comprising intermittent gears that are interlocked, and one of which is capable of longitudinal movement with relation to the other to move the intermittent-gear portions out of mesh or line, and said parts being operable one to actuate the other and afterward to lock the counter against operation, substantially as described.

288. In a voting-machine, the combination, with a counter, having intermittent gear, with an intermittent-gear actuator, having a cylindrical locking portion in engagement with said counter, said actuator adapted to longitudinal movement to position the intermittent parts thereof opposite the counter-wheel, while the cylindrical portion is still in engagement with said wheel, and means for rotating or oscillating the actuator to operate the counter, substantially as described.

289. The combination, with interlocked counter and actuator parts, of an actuator-operating key, said actuator being revoluble with respect to said key and in a plane transverse thereto, but incapable of rotation thereby to move the counter, substantially as described.

290. The combination, with interlocked intermittent-gear counter and actuator parts, both revoluble, said counter being operable by the actuator only, with means for oscillating the actuator a distance greater than that required to move the counter one step, and said actuator having an independent voting movement, to position it for operation upon said counter, substantially as described.

291. In a voting-machine, the combination, with two or more counters, of oscillatory longitudinally-movable actuators therefor, an operating-bar common to said actuators and suitably connected therewith, and said bar and actuators being relatively movable along the axes of said actuators longitudinally thereof, permitting the operation of the actuators after the same have been moved longitudinally to condition the same for operation upon their counters, substantially as described.

292. The combination, with the counter, of a one-part actuator normally interlocked therewith and capable of longitudinal movement or reciprocation by a voter while interlocked with the counter, and without operating the same, said actuator having a part to operate said counter, and means for oscillating the actuator to operate said counter, substantially as described.

293. The combination, with the counter, of an actuator interlocked therewith and capable of longitudinal movement or reciprocation by a voter while interlocked with the counter, and without operating the same, said actuator having a part to operate said counter, means for oscillating the actuator to operate said counter, and accomplishing a relatively greater movement of the actuator than is required for one step of the counter, and means for returning said actuator, substantially as described.

294. The combination, with the counter, of an actuator interlocked therewith and adapted to be reciprocated by a voter while it is interlocked with said counter, means to oscillate the actuator to unlock, operate and then again lock said counter, means to accomplish the longitudinal return of the actuator, and means operable thereafter to accomplish the return oscillation thereof to prepare the actuator for the next voter, substantially as described.

295. The combination, with the counter, of an actuator, normally interlocked therewith, said counter and actuator being revoluble in the same or parallel planes, and one thereof being movable independently of the other, transversely to the plane of rotation to position the actuator for operation upon the counter, and means for operating the actuator, substantially as described.

296. The combination, with the counter, of an actuator adapted to be reciprocated in either direction by a voter without operating the counter, means to impart an independent movement to the actuator to operate the counter, and means preventing the return movement of the actuator by a voter after the beginning of said independent movement of the actuator, substantially as described.

297. The combination, in a voting-machine, of a counter, with a longitudinally-movable actuator, capable of movement by a voter, means to oscillate the actuator in either longitudinal position, but said actuator being operable upon the counter in one of its longitudinal positions only, substantially as described.

298. The combination, with the counter, with an actuator interlocked therewith, and capable of reciprocation and also of rotation independently of the counter while interlocked therewith and provided with the part for operation upon the counter after the actuator has been reciprocated and when the actuator is rotated, substantially as described.

299. The combination, with the counter, of an actuator adapted to be reciprocated in either direction by a voter, one such movement placing the actuator for operation upon the counter, said actuator being inoperative by the voter to move the counter, independent means for imparting the counting movement to the actuator, and means upon the actuator to prevent the withdrawal or return movement thereof after the beginning of its operation upon the counter, substantially as described.

300. The combination, with the counter, of a key, and an actuator capable of a voting movement, and also a counter-operating movement, and said actuator adapted to be returned at any time except during its operating movement and not then returnable, substantially as described.

301. The combination, with a counter and an actuator, adapted to be moved by a voter to position the same for operation upon the counter, means for imparting an independent oscillating movement to the actuator to engage its operating part with the counter, and an assisting device to also engage the counter when said operating part is in partial engagement therewith, substantially as described.

302. The combination, with a counter and an actuator, adapted to be moved by a voter to position the same for operation upon the counter, means for imparting an independent oscillating movement to the actuator to engage its operating part with the counter, and an assisting device to also engage the counter when said operating part is in partial engagement therewith, said assisting device being ineffective to operate the counter when the operating part is disengaged therefrom or is wholly and properly engaged therewith, substantially as described.

303. The combination, with the counter-wheel, with the cylindrical actuator interlocked therewith, and provided with the high and low teeth to engage the counter-wheel, the pitch-line of said tooth being coincident with the periphery of said cylinder, whereby locking-grooves are formed on opposite sides of the tooth, and said actuator being longitudinally movable to position said teeth for engagement with the counter-wheel, substantially as described.

304. The combination, with the counter-wheel, with the cylindrical actuator interlocked therewith and provided with a tooth to engage the counter-wheel, the pitch-line of said tooth being coincident with the periphery of said cylinder, whereby locking-grooves are formed on opposite sides of the tooth, said grooves being extended beyond the tooth, and the short or assisting tooth, the top of which is coincident with the pitch-line of the first tooth, substantially as described.

305. The combination, with the counter, of a longitudinally-movable cylindrical actuator interlocked with the counter, and provided with a counter-operating tooth of less length than said cylinder, and means to rotate said cylinder after the tooth thereon has been positioned by the longitudinal movement of the cylinder, and while said cylinder and counter remain interlocked to prevent independent operation of the counter, substantially as described.

306. The combination, with the frame of the counter-wheels thereon, the longitudinally-movable actuator capable of oscillation, having a tooth normally in forward position, and the gear-wheels of said counter being stepped out whereby said tooth when in its forward position is substantially in the plane of the faces of said counter-wheels, as and for the purpose specified.

307. The combination, with a series of counters, of actuators and an actuator-rack movable transversely to the voting movement of said actuators to rotate the actuators without regard to the longitudinal positions thereof, substantially as described.

308. The combination, with the counter gear-wheel, of the cylindrical actuator provided with a tooth, said actuator being longitudinally movable by a voter, and independently revoluble, and means to prevent a return longitudinal movement of the actuator after its tooth has been rotated to engage the counter-wheel, and until the tooth has been disengaged therefrom, substantially as described.

309. The combination, with a counter, of an actuator that is a permanent part of the machine and is longitudinally movable by a voter to set the same in position for operation upon the counter, means for rotating the actuator to move the counter, and means automatically compelling the proper movement of the counter when the actuator is engaged therewith, substantially as described.

310. The combination, with the counter, of the actuator interlocked therewith, said actuator being reciprocable by a voter to position the same for an operation upon the counter, and being independently revoluble to operate the counter, and means automatically compelling the complete operation of the counter when the actuator is rotated after being set by a voter, substantially as described.

311. The combination, with the counter, of a freely-revoluble voter's key adapted for longitudinal movement by a voter, an actuator freely revoluble on said key and movable longitudinally therewith to be set for operation upon the counter, and independent means for rotating the actuator, substantially as described.

312. The combination, with a row of two or more counters, and two or more voters' keys therefor, an actuator upon each key and revoluble thereon, and adapted for longitudinal movement therewith, said actuators having parts to engage said counters, and means to rotate said actuators simultaneously whether the same have been moved longitudinally or not, substantially as described.

313. The combination, with two or more counters, of revoluble actuators therefor, said actuators being set by moving the same longitudinally, each actuator having a gear, pinion and a rack permanently engaging said pinions to simultaneously operate said actuators, substantially as described.

314. In a voting-machine the combination, with two or more counters, and the actuators therefor, with an actuator-rotating bar positively and constantly engaged with said actuators, said actuators adapted to be set by a voter while engaged with said bar and without disengagement therefrom, and means for operating said bar to oscillate said actuators, substantially as described.

315. In a voting-machine the combination, with two or more counters, and the actuators therefor, with an actuator-operating bar positively engaged with said actuators, said actuators adapted to be set by a voter while engaged with said bar and without disengagement therefrom, means for operating said bar to oscillate said actuators, and positively-actuated locking means in connection with said bar preventing independent operations of the actuators upon said counters, substantially as described.

316. In a voting-machine the combination, with the counters, of the longitudinally-movable revoluble actuators, each provided with a pinion, and a rack-bar always engaging all said pinions to rotate said actuators and locking the same against independent rotation while permitting longitudinal movement thereof, substantially as described.

317. In a voting-machine, the combination, with a counter, a key, counter-operating means adapted by said key to be set by a voter for operation, a booth or closure, and means to accomplish the complete movement of said counter through the action of said operating means when the voter leaves the voting-machine, and means operable upon the entrance of the voter to the machine to move and return or reset the counter-operating means, substantially as described.

318. In a voting-machine, the combination, with a suitable frame, of the counter having its unit-wheel provided with an intermittent gear-wheel, an actuator comprising a cylindrical portion interlocked with said gear-wheel and having an operating-tooth which when said actuator is moved by a voter is positioned for operation upon said gear-wheel, the pinion upon said actuator, means engaging the same for its operation, and said actuator having a reduced portion between its cylindrical and gear portions whereby when the actuator is abnormally withdrawn said counter-wheel may be disengaged to permit the independent movement thereof for the purpose of returning the counter to zero, substantially as described.

319. A unit-frame, of channel-like structure, in combination with the cross-studs therein, the limiting mechanism operable in said frame beneath the said studs, the voting devices provided upon said studs, and the operating and returning parts provided in said frame above said studs, substantially as described.

320. A unit-frame of channel-like structure, in combination with the cross-studs therein, the limiting mechanism operable in said frame beneath said studs, the voting devices provided upon said studs and the operating and returning bars provided in said frame above said studs, and means provided in said frame to operate said bars and said limiting mechanism, substantially as described.

321. A unit-frame of channel-like structure, in combination with the cross-studs therein, the limiting mechanism operable in said frame beneath said studs, the voting devices provided upon said studs, and the operating and returning bars provided in said frame above said studs, and means provided in said frame to operate said bars and said limiting mechanism, the same means operating to lock all the devices in said frame, substantially as described.

322. In a voting-machine, a frame or guide and a combined voting-key and annunciator in two distinct parts only, one stationary, and both permanently arranged therein, substantially as described.

323. In a voting-machine, a key movable by a voter, and a stationary annunciator comprising a part within said key and normally concealed therein, substantially as described.

324. A key for voting-machines comprising the sleeve-like key proper, and the stationary annunciator therein, substantially as described.

325. In a voting-machine, the combination, of the key, and the associated mechanisms, of an annunciator supporting and serving as a guide for the key, substantially as described.

326. The combination, in a voting-machine, of the unit-frame, with the cross-studs 17 therein, and the voting mechanisms provided in said frame, and having parts supported and longitudinally guided and movable by a voter upon said studs in lieu of other frame parts, substantially as described.

327. The combination, with the unit-frame, of the cross-studs 17 therein, the counter-wheels and the actuator arranged upon the different studs, a series of wedge-blocks, separators movable with said actuators and guided by and longitudinally upon one of said studs, substantially as described.

328. The combination, with the frame, of the studs 17 therein, the counter-wheels revoluble upon the ends of said studs, one of said studs bearing the key, and another the shifter 27, of the limiting mechanisms, an actuator, and said key and shifter being slidable upon their studs to condition said actuator for operation upon said counter-wheels, substantially as described.

329. In a voting-machine, the combination, with a suitable frame, of a counter and actuator movable transversely of said frame, an actuator-key, a shifter movable with said key, a limiting device, swinging means carrying parts of said limiting device, a separator attached to said shifter provided with a buffer of rubber or light material, to stop by contact with said frame, substantially as described.

330. In a voting-machine, two, four or more segregable units, one for each office, and each having a series of counters, means for operating said counters, one counter in each unit devoted to the registry of votes upon amendments or questions, and said units being paired with their amendment-counters interconnected to prevent the registering of votes upon both by one voter, one unit of each pair having means extending into the next unit and operative with either of the amendment devices therein to hold the other in an inoperative position while the first is in operative position, substantially as described.

331. In a voting-machine, two, four or more segregable units, one for each office, and each having a series of counters, means for operating said counters, one counter in each unit devoted to the registry of votes upon amendments or questions, and said units being paired with their amendment-counters interconnected to prevent votes upon both by one voter, one unit of each pair having means extending into the next unit and operative with either, of the amendment device therein to secure the other in an inoperative position, and either of the amendment devices being operative by a voter for the operation of the other to return or retract said other device, substantially as described.

332. A voting-machine comprising two or more tiers of counting mechanisms, means for connecting the actuators of two counters in adjoining tiers, and an independent limiting mechanism provided with the other counters in said tiers, and a positively-actuated common means for positively rerotating and also forcing out all of the counter-actuators that were voted in said tiers, substantially as described.

333. The combination, of two segregable machine units having mechanism for recording votes for regular candidates for their respective offices, and each also provided with an extra counter device, and means in one of said units preventing the operation of both the extra counters, to record the votes of one voter, substantially as described.

334. In a voting-machine, two counters for recording "yes" and "no" votes upon questions, each having its actuator, and a pivoted lever-interlocking device between said actuators, the operation of one automatically annulling the previous operation of the other, substantially as described.

335. In a voting-machine, the combination, with several tiers of voting mechanisms, each tier representing an office, with a single operatively-flexible limiting mechanism common to all said tiers and tied together throughout the same for the communication of movement throughout the said tiers, and constituting an eventual limit of operation for the mechanisms, and means for separating said limiting mechanism into several parts dividing said tiers into single and multi office groups, substantially as described.

336. In a voting-machine, the combination with a plurality of tiers of voting mechanisms in single and multi candidate groups one tier for each office, the limiting mechanisms for said tiers suitably connected, and a single device or interrupter for breaking the multicandidate group of the whole into smaller multicandidate groups or single-candidate groups, substantially as described.

337. In a voting-machine, the combination with a plurality of tiers of voting mechanisms in single and multi candidate groups, one tier for each office, of the limiting mechanisms for said tiers, and suitably connected, and a single device for interrupting the movement of the limiting mechanism connections at predetermined points to establish two or more groups, substantially as described.

338. In a voting-machine, the combination of a plurality of tiers of voting mechanisms in single and multi candidate groups, one tier for each office, with a limiting mechanism, and a single device fixing the boundaries of the limiting mechanism for both the single and multicandidate groups included in said tiers, substantially as described.

339. In a voting-machine, the combination of a plurality of tiers of voting mechanisms, one tier for each office, with a limiting mechanism and a single device for establishing the single-office tiers or groups and leaving intermediate tiers free for multicandidate voting, substantially as described.

340. In a voting-machine, the combination of a plurality of tiers of voting mechanisms, one for each office, with the limiting mechanism of each tier, and a single device movable to alter the relations of the limiting mechanisms of the plurality of tiers, locking some thereof and permitting the interoperation of others for multicandidate voting, substantially as described.

341. In a voting-machine, the combination of a plurality of tiers of voting mechanisms, one for each office, of limiting mechanisms corresponding therewith and connected throughout, and a single device for interrupting the movement of the connections between said limiting mechanisms to establish the boundaries of two or more single and multi candidate groups, substantially as described.

342. In a voting-machine, comprising a number of tiers of voting mechanisms and associated devices including a limiting mechanism in each tier, in combination with connections between the limiting mechanisms of adjoining tiers and movable with and parallel to the same and a notched locking-bar, and means for interrupting the movement of said connections to establish the single and multi candidate groups of voting mechanisms, substantially as described.

343. In a voting-machine, the combination of the voting mechanisms each including a separator, the wedge-blocks engaged with the separators of the different voting mechanisms, and positively-actuated means for successively returning said separators and justifying the same after the operation of said voting mechanisms, substantially as described.

344. In a voting-machine, a suitable frame in combination with a series of rotary counters and rotary counter-actuators, the latter transversely operable in said frame and parallel actuator operating and returning means, both of which means are longitudinally movable in said frame, substantially as described.

345. In a voting-machine having a counter for each candidate and a key for each candidate, said keys being operable in both directions by a voter without operating the counter, and a sleeve-like counter-actuator upon each key and independently movable for operating its counter but dependent upon its key, substantially as described.

346. In a voting-machine, a suitable frame, having a counter for each candidate, fixed in said frame, and a key for each candidate, said keys being operable in said frame in both directions without operating their counters, and independently-revoluble means dependent upon each key for operating its counter and which is operated without moving the key, and a suitable limiting mechanism, substantially as described.

347. In a voting-machine, a suitable frame having a counter for each candidate and a key for each candidate, said keys being adapted for reciprocation in said frame by a voter, and a revoluble actuator movable with each key and adapted to be positioned for operation upon the associated counter by the movement of said key, and means positively operating through the medium of the actuators that are set to operate the counters thereof without moving their keys, substantially as described.

348. In a voting-machine, a counter, a counter-actuator, and an actuator-key respectively movable, said counter adapted for operation only by said actuator, automatic positively-actuated means for operating said actuator independently of said key, said actuator adapted to be positioned but not operated by said key, and means preventing the movement of the key after the actuator has started to operate the counter, substantially as described.

349. In a voting-machine, the combination, with a counter, of an actuator longitudinally movable by a voter to set the same in position for operation upon the counter, means for rotating the actuator to move the counter, and means on the actuator automatically compelling the movement of the counter one step only when the actuator is engaged therewith and rotated, substantially as described.

350. In a voting-machine, a series of machine units resting one upon the other, each comprising a frame, and counting, limiting and controlling mechanisms and the limiting mechanisms of which are adapted to be engaged and connected one with the other by the act of assembling said units, and suitable stops in the first and last units adapting the mechanisms thereof for multicandidate voting, substantially as described.

351. The combination, in a voting-machine, of a suitable frame with a series of counters fixed therein, each counter having a voting-key and an actuator movable with respect thereto, said key in each case adapted to be moved to indicate or to retract a vote without operating the counter, and said actuator in each case adapted to be moved to operate the counter without moving the key, means for operating said actuators, independent means for returning the keys and actuators, and a limiting mechanism controlling the operation of said keys and through the medium thereof controlling the operation of said actuators, substantially as described.

352. The combination, in a voting-machine, of a plurality of counters with a key for each, an independent counter-operating means for each key moved but not operated thereby, and means for actuating said operating means to move the counter one step and independent means to afterward return the operating means, and a suitable limiting mechanism operable by said keys, substantially as described.

353. The combination, in a voting-machine, of a plurality of counters with a key for each, an independent counter-operating means for each key moved but not operated thereby, and means for actuating said operating means to move the counter one step and afterward return the operating means, and independent means operating thereafter to return the keys and move the actuators to their initial positions therewith, and a suitable limiting mechanism controlling the operation of the keys, substantially as described.

354. In a voting-machine, the combination with a frame of a plurality of tiers, of counters therein, a key for each counter and movable by a voter to indicate or retract a vote, an actuator for each counter, said actuators being always interlocked therewith and movable with respective keys by the voter, means in each tier positively connecting all of the actuators therein that represent candidates, said means being stationary during the time that a voter may cast his ballot and at such time serving to prevent the operation of said actuators upon their counters while permitting the actuators to be set for operation upon their counters at a later time, a positively-actuated mechanism for moving said means connecting the actuators to operate the actuators and counters for which the keys and actuators have been set, a limiting mechanism for each tier, a separator for and movable with each key, said separators being movable in said frame with the limiting mechanism, means whereby the relations of the separators and the corresponding parts of the limiting mechanism are made constant with respect to space, and positively-actuated means for returning said keys, separators and actuators after the operation of the actuators upon the counters, substantially as described.

355. In a voting-machine, the combination with a frame of a plurality of tiers, of counters therein, a key for each counter and movable by a voter to indicate or retract a vote, an actuator for each counter, said actuators being always interlocked therewith and movable with respective keys by the voter, means in each tier positively connecting all of the actuators therein that represent candidates, said means being stationary during the time that a voter may cast his ballot and at such time serving to prevent the operation of said actuators upon their counters while permitting the actuators to be set for operation upon their counters at a later time, a positively-actuated mechanism for moving said means connecting the actuators to operate the actuators and counters for which the keys and actuators have been set, a limiting mechanism for each tier, a separator for and movable with each key, said separators being movable in said frame with the limiting mechanism, means whereby the relations of the separators and the corresponding parts of the limiting mechanism are made constant with respect to space, and positively-actuated means for returning said keys, separators and actuators after the operation of the actuators upon the counters, parts upon said frame bearing the names of the offices and of candidates, means for exposing the count, and positively-actuated means operating to lock said counters against operation while the count is exposed, substantially as described.

356. In a voting-machine, the combination with the frame, of a plurality of tiers with counters provided therein representing offices to which candidates are to be elected, a limiting mechanism comprising a series of wedge-blocks for each said tier, a voting-key for each counter and movable by a voter to indicate or retract a vote, a separator for each key movable thereby to engage said limiting-blocks or to disengage the same, oscillatory counter-actuators one for each key and its counter and movable by its key to position the actuator for operation upon the counter, means preventing the operation of the counter through the medium of the key, and means for simultaneously operating all of the actuators and thereby operating the counters for which actuators have been set, substantially as described.

357. In a voting-machine, the combination with the frame, of a plurality of tiers with counters provided therein representing offices to which candidates are to be elected, a limiting mechanism comprising a series of wedge-blocks for each said tier, a voting-key for each counter and movable by a voter to indicate or retract a vote, a separator for each key movable thereby to engage said limiting-blocks or to disengage the same, oscillatory counter-actuators one for each key and its counter and movable by its key to position the actuator for operation upon the counter, means preventing the operation of the counter through the medium of the key, and positively-actuated means for simultaneously oscillating all of the actuators that have been set to operate their counters without moving their keys, and positively-actuated independent means for thereafter positively restoring the voted keys, actuators and separators, substantially as described.

358. In a voting-machine, the combination with a suitable frame of a series of counters therein, a key and actuator for each counter both thereof being movable by a voter with relation to the counter to indicate or retract a vote without operating said counter, positively-actuated means operating after the voting movements of the voter to move said actuators without moving their keys and operate the selected counters, and independent means for afterward restoring both the keys and actuators to the non-voted position, and a suitable limiting mechanism controlling the operation of said keys by a voter, substantially as described.

359. In a voting-machine of two or more tiers of counters and associated devices for each, one counter in each of two tiers being employed for counting votes upon amendments or questions, means interconnecting the same to annul a vote upon one if the second is operated to register a vote and means common to the associated devices of all the counters for restoring the same, substantially as described.

In testimony whereof witness my hand, this 8th day of December, 1898, at Washington, District of Columbia.

JAMES H. DEAN.

In presence of—
C. P. ELWELL,
C. G. HAWLEY.